US007171491B1

(12) United States Patent
O'Toole et al.

(10) Patent No.: US 7,171,491 B1
(45) Date of Patent: Jan. 30, 2007

(54) METHODS AND APPARATUS FOR MANAGING DATA DISTRIBUTION IN A NETWORK

(75) Inventors: James O'Toole, Somerville, MA (US); John H. Jannotti, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 749 days.

(21) Appl. No.: 09/865,161

(22) Filed: May 24, 2001

Related U.S. Application Data

(63) Continuation-in-part of application No. 09/752,842, filed on Dec. 29, 2000.

(60) Provisional application No. 60/177,985, filed on Jan. 25, 2000.

(51) Int. Cl.
G06F 15/173 (2006.01)
G06F 15/16 (2006.01)

(52) U.S. Cl. .................. 709/244; 709/218; 709/245

(58) Field of Classification Search ............. 709/206, 709/213, 214, 216–219, 225–227, 232, 238, 709/244–245; 707/10
See application file for complete search history.

(56) References Cited

U.S. PATENT DOCUMENTS

| 4,819,208 | A | * | 4/1989 | Nakabayashi et al. . | 365/189.04 |
|---|---|---|---|---|---|
| 5,471,580 | A |  | 11/1995 | Fujiwara et al. .......... | 709/249 |
| 5,761,417 | A | * | 6/1998 | Henley et al. ........... | 709/231 |
| 5,808,607 | A | * | 9/1998 | Brady et al. ............... | 345/756 |
| 5,809,078 | A | * | 9/1998 | Tani et al. ................ | 375/259 |
| 5,831,975 | A | * | 11/1998 | Chen et al. .............. | 370/256 |
| 5,941,955 | A |  | 8/1999 | Wilby et al. ............. | 709/242 |
| 6,052,718 | A |  | 4/2000 | Gifford ..................... | 709/219 |
| 6,061,722 | A |  | 5/2000 | Lipa et al. ................ | 709/224 |
| 6,134,599 | A |  | 10/2000 | Chiu et al. ............... | 709/252 |
| 6,282,172 | B1 | * | 8/2001 | Robles et al. ............ | 370/230 |
| 6,438,596 | B1 | * | 8/2002 | Ueno et al. .............. | 709/226 |
| 6,470,391 | B2 | * | 10/2002 | Takamoto et al. ........ | 709/227 |
| 6,496,520 | B1 | * | 12/2002 | Acosta ..................... | 370/474 |

(Continued)

FOREIGN PATENT DOCUMENTS

| WO | WO 9701913 A2 * | 1/1997 |
|---|---|---|
| WO | WO 9837667 A2 * | 8/1998 |

OTHER PUBLICATIONS

RFC 1112, S. Deering, Aug. 1989.*

*Primary Examiner*—Glenton B. Burgess
*Assistant Examiner*—Yasin M. Barqadle
(74) *Attorney, Agent, or Firm*—BainwoodHuang

(57) ABSTRACT

The invention is directed to techniques for managing data distribution in a network. A source or root node distributes data (e.g., video data) throughout a network of nodes by distributing data from parent to child through a tree of nodes. The nodes distribute the data through the network concurrently in a real-time manner, but retain copies of the data in nonvolatile data storage on each node. Thus, the data remains accessible on each node so that the data is available after the real-time distribution of the data. After the real-time distribution of the data, a new node can attach to any of the nodes currently in the network as a child of that node, and then the new node can request a copy of the data from the data storage of that parent node.

37 Claims, 10 Drawing Sheets

U.S. PATENT DOCUMENTS

| | | | |
|---|---|---|---|
| 6,611,872 B1 * | 8/2003 | McCanne | 709/238 |
| 6,687,222 B1 | 2/2004 | Albert et al. | 370/230 |
| 6,728,775 B1 * | 4/2004 | Chaddha | 709/231 |
| 6,766,365 B1 * | 7/2004 | Huang et al. | 709/223 |
| 2002/0103848 A1 * | 8/2002 | Giacomini et al. | 709/200 |
| 2005/0021621 A1 * | 1/2005 | Welch et al. | 709/204 |

* cited by examiner

METHODS AND APPARATUS FOR MANAGING DATA DISTRIBUTION IN A NETWORK

CROSS REFERENCE TO AND CLAIM TO BENEFIT OF RELATED APPLICATIONS

This application is a continuation-in-part of, and claims the benefit of the filing date of, U.S. patent application Ser. No. 09/752,842 filed Dec. 29, 2000, entitled, "Methods and Apparatus for Maintaining a Map of Node Relationships for a Network," the disclosure of which is incorporated in its entirety herein by reference, which claims the benefit of the filing date of U.S. Provisional Patent Application No. 60/177,985, filed Jan. 25, 2000, entitled "Fast Changing Network Status and Load Monitoring and Feedback," the disclosure of which is incorporated in its entirety herein by reference.

This application is related to U.S. Pat. No. 6,052,718, issued Apr. 18, 2000, entitled "Replica Routing," the disclosure of which is incorporated in its entirety herein by reference.

BACKGROUND OF THE INVENTION

Historically, computers have communicated over dedicated communication lines or through a specific connection, such as a modem connection from one computer to another. Computers have also been connected in networks that allow communications among a number of computers. Data can be distributed to designated groups of computers in such networks, such as when one computer in the network initiates the distribution of video data to a specified group of computers in the network.

One example of a conventional data distribution approach is IP (Internet Protocol) multicasting, described in RFC1112 from the IETF (Internet Engineering Task Force). This approach provides for the distribution of data to a group of specified nodes (e.g., routers) in the Internet using a multicasting protocol. In such an approach, an originating or root node distributes the data (e.g., video data) to routers that redistribute the data through the network to computers (e.g., clients) for use by the users of those computers in real time (e.g., viewing the video data without any substantial delay as the video data is distributed through the network). In such a conventional approach, the distribution of data is typically based on an unreliable transport protocol, such as UDP (User Datagram Protocol) or RTP (Real-time Transport Protocol), that is, a protocol that does not verify that each packet has been received.

Another example of a conventional data distribution approach is a client/server approach for the real-time transfer of data (e.g., for use or viewing on a display screen of the client by a user as the data is being transferred from the server to the client). For example, a real-time server application can execute on a server computer to provide for the real-time distribution of data (e.g., video or audio data) to a client for use in the same time frame as the distribution of the data. RealNetworks, Inc. of Seattle, Wash. provides one example of such a real-time server application for distributing data.

SUMMARY OF THE INVENTION

In conventional systems, as described above, the root or disseminating node distributes the data to other nodes (e.g., computer or network device, such as a router) in a real-time mode, meaning that the data is distributed throughout the network without substantial delay in each network device (e.g., router) that distributes the data such that the data is received and used (e.g., viewed by a user of the client) in a continuous and uninterrupted time frame. Each node in the network receives the distributed data and passes it on to the next node in the network without retaining the distributed data for a longer period than is necessary to transfer the data to the next node. In many situations, a node receiving data does not always receive all of the data, as when packets of data are "dropped" or lost during a transmission of video data. For a transmission over many intermediate nodes, the loss of data can become significant. For example, the loss of data may result in a noticeable decline in quality or performance, as when video transmissions over the Internet display a halted or jerking movement, due to the loss of packets of data. In addition, such a conventional distribution system should not be used for data that must be distributed reliably, such as a file representing an upgrade to a software application that must be distributed without losing any packets of data (i.e., for data that must retain a "bit for bit" reliability in the transmission).

Conventional approaches, as described above, typically require that the root node distribute the data to a group of nodes in a defined group (e.g., a named set of clients or hosts, which are end-users or receivers of the data) to receive the data in a real-time transmission. The name space used in such systems (e.g., IP multicast) is a flat name space, rather than a hierarchical one, that can limit the number of nodes (e.g., in an IP multicast group). In addition, conventional approaches, as described above, typically require specialized software (e.g., applets or plug-ins) in each end-user or client to receive the distribution of data.

In contrast, the present invention provides techniques for storing distributed data on a node (i.e., transferring node) after transferring the data to other nodes in the network, so that the distributed data remains available on the node after the distribution of data throughout the network. The transferring node can receive a quantity or collection of data (e.g., video data, audio data, or software file), which can be stored in a buffer during the period of transfer. The transferring node retains the collection of data in the buffer during the time period required to complete the transfer and then moves the collection of data to a nonvolatile data storage, such as a disk, for storage on the transferring node. Thus, if the collection of data is distributed using an unreliable transport protocol (e.g., UDP), and a receiving node determines that it does not receive all of the collection of data, the receiving node can later request the missing data from the transferring node to complete the collection of data.

In addition, at a substantially later time, after the initial distribution of the distributed data over the network, another node, which did not received the distributed data, can contact a transferring node to request that a copy of the complete collection of data be transmitted from the nonvolatile data storage associated with the transferring node. A client that elects to receive the distributed data can receive the distributed data after its initial distribution. For example, a user of a client computer can use a browser that executes on the client computer to contact a transferring node (e.g., router or server) over the Internet to receive a video stream, some time after the initial distribution of the video has taken place.

Also, in the approach of the invention, there is no requirement that clients have a specialized software application (e.g., plug-in for a browser), as is typically required for conventional systems, in order to receive distributed data.

Typically, the techniques of the invention can be used with existing software (e.g., Internet browsers) and existing protocols (e.g., UDP). In addition, in contrast to conventional systems that have a flat or limited name space (e.g., IP multicast), the techniques of the invention can be used with an unrestricted name space based on standard addressing protocols, such as URL's (Uniform Resource Locators).

Furthermore, the techniques for the invention can be used with an overlay network. An overlay network is a network based on logical relationships that overlay an underlying network based on other connections (e.g., TCP, GRE or LZTP connections). An example of an overlay network is given in below. In such a network, the logical relationships among the nodes in the network represent connections among nodes (e.g., computers or other networked devices) that are virtual relationships in the overlay network, in which the logical relationships among nodes in the overlay network typically do not conform to the physical connections among the computers (e.g., the logical relationships represent virtual connections). For example, relationships of interest can be based on physical connections (e.g., connection or disconnection of a physical cable connecting to the network), data communication links (e.g., establishment or termination of a Transmission Control Protocol or TCP connection over a physical network) or virtual connections (e.g., GRE, L2TP or other similar packet-encapsulation or tunnel-type connections such as PPPoE).

In one environment suitable for use with the invention, a root node provides content that is distributed (e.g., "overcast") over nodes in a network, such as video data distributed over a network of nodes in the Internet, which then serve as intermediaries to pass through the content to other nodes or which act as servers that provide the content to clients (e.g., end-users who wish to receive the content). If a client wishes to receive content (e.g., video) from the root, the root may direct the client to attach itself to one of the servers receiving the distributed content from the root. In addition, the techniques of the invention allow the root to use a very large network with substantially the same performance throughout the network so that content information can be reliably provided to a very large number of clients, using many pathways through the network so that many clients can receive the content without any substantial performance degradation.

In one embodiment, the invention is directed to a method, in a transferring node, for distributing data in a hierarchical network of nodes. The method includes receiving a collection of data (e.g., video or audio data) from a provider node (e.g., parent of the transferring node) in the hierarchical network of nodes, transferring a copy of the collection of data to a child node of the transferring node in the hierarchical network of nodes in response to receiving the collection of data, and storing the collection of data in a data storage (i.e., nonvolatile memory or data storage, such as a disk) after completing the step of transferring the copy of the collection of data. Thus, the collection of data remains available after the transfer. For example, a node or client newly joining the network can request a copy of the collection of data from the transferring node, even though the initial distribution has been completed. In addition, the network as a whole can handle a larger bandwidth of data distribution than a network that does not provide for storage of the collection of data. For example, a node can transfer a copy of the data to one client, store the data, and then transfer a copy of the data from storage to a second client immediately (or with substantially minimal delay) after the transfer to the first client.

In another embodiment, the collection of data represents content distributed as a stream of packets to the hierarchical network from a source node. The method includes receiving the stream of packets in a buffer, propagating the stream of packets from the buffer to descendent nodes of the transferring node for access by a first client making a first request for the collection of data from the descendent node, and transferring the stream of packets from the buffer to the data storage in the transferring node in a manner enabling access to the collection of data by a second client making a second request for the collection of data. Thus, the receiving node stores the stream of packets in a buffer until the transfer is complete, and then stores the stream of packets in a nonvolatile data storage, such as a disk, so that a client (or new node to the network) can request a copy of the stream of packets at a later time. Thus, the nodes in the network can efficiently distribute the stream of packets throughout the network, but also retain the stream of packets in storage for future requests for the stream of packets. Furthermore, if the buffer is limited in size (e.g., volatile memory such as RAM having megabytes of capacity) and/or the relationship to the provider node allows for a very high rate of bandwidth transfer, the stream of packets can be stored in the data storage having much larger capacity than the buffer (e.g., a disk having gigabytes of capacity), and then distributed to child nodes (e.g., having limited bandwidth relationships) without interruption (as may be caused by overflowing a buffer of limited size).

In a further embodiment, the child node is one of a plurality of child nodes, and the method includes transferring copies of the collection of data to each of the plurality of child nodes, if each child node is available over the hierarchical network. Thus, a transferring node can check to determine which of its child nodes are available to receive copies of the collection of data (e.g., one or more child nodes may be unavailable due to a break in the relationship to that child node, or if the child node has experienced a system failure). Then the transferring node transfers the collection of data only to those child nodes that are available.

In another embodiment, the method includes receiving a verification from the child node that the copy of the collection of data received by the child node is a complete copy of the collection of data. The transferring node is thus able to determine when the transfer of the collection of data has occurred, even if using an unreliable transport mechanism, such as UDP, that does not verify individually the transmittal of each packet (as is done in a reliable transport mechanism such as TCP).

In a further embodiment, the collection of data includes a plurality of packets of data and the step of transferring the copy of the collection of data includes (i) receiving an indication from the child node that the copy of the collection of data received by the child node is incomplete, and (ii) transferring copies of one or more packets of data to the child node to complete the copy of the collection of data received by the child node. For example, a node can request additional packets of data to complete a collection of data after receiving the collection of data using an unreliable transport mechanism (such as UDP).

The method, in another embodiment, includes transferring an additional copy of the collection of data to an additional child node of the transferring node based on a request from the additional child node. For example, a new node (i.e., additional node) can join the network as a child of an established node already in the network, and then request the transmission to the new node from the storage on the established node of the collection of data that was previously distributed throughout the network.

In another embodiment, the method includes transferring the copy of the collection of data between the provider node and the child node through the transferring node in a delayed timing mode. Thus, the transferring node can receive the collection of data from a provider node, store the collection of data in a data storage on the transferring node, and later effect the transfer of the collection of data to a child node. For example, the transferring node can transfer one copy of the collection of data to one child node in a real-time mode, and then transfer another copy of the collection of data to another child node in a delayed timing mode, in effect, increasing the amount of bandwidth that the transferring node can provide for a distributing data through the transferring node. Thus, the other child node can receive the second copy of the collection of data almost as quickly as the first child node receives its copy, if the transferring node distributes the second copy immediately (or without substantial delay) after distributing the first copy.

In a further embodiment, the method includes retaining the collection of data after confirming the receipt of the copy of the collection of data by the child node. Thus, the transferring node retains the collection of data in data storage on the transferring node, even after receiving an acknowledgment or receipt indicating that the child node has received its copy of the collection of data. Thus, the nodes in the network can distribute data in a reliable manner, even if using an unreliable transport mechanism (such as UDP).

In an additional embodiment, the method includes providing an acknowledgment indicating that the collection of data is complete and the step of transferring the collection of data is performed after the step of providing the acknowledgment. For example, the transferring node receives the collection of data from a provider node (e.g., parent of the transferring node) and provides an acknowledgment. Thus, the nodes in the network can provide acknowledgment that the data has been received, even if an unreliable transport protocol (such as UDP) has been used.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention provides techniques for storing distributed data on a node (i.e., transferring node) after transferring the data to other nodes in a network, so that the distributed data remains available on the node after the transfer has occurred. The transferring node can receive a quantity or collection of data (e.g., video data, audio data, or a software file), which can be stored in a buffer during the period of transfer. The transferring node retains the collection of data in the buffer no longer than the time period required to complete the transfer and moves the collection of data to nonvolatile data storage (e.g., concurrently), such as a disk, for storage on the transferring node. Thus, if the collection of data is distributed using an unreliable transport protocol (e.g., UDP) and a receiving node determines that it does not receive all of the collection of data, the receiving node can later request the missing data from the transferring node to complete the collection of data.

In addition, at a substantially later time, after the initial distribution of the data over the network, another node, which did not received the distributed data, can contact a transferring node to request a copy of the complete collection of data to be transmitted from the data storage associated with the transferring node. A client that elects to receive the distributed data can receive the distributed data at any time after its initial distribution. For example, a user of a client PC can use a browser on the PC (personal computer) to contact a transferring node (e.g., router or server) over the Internet to receive a video stream, some time after the initial distribution of the video.

Figure 1:
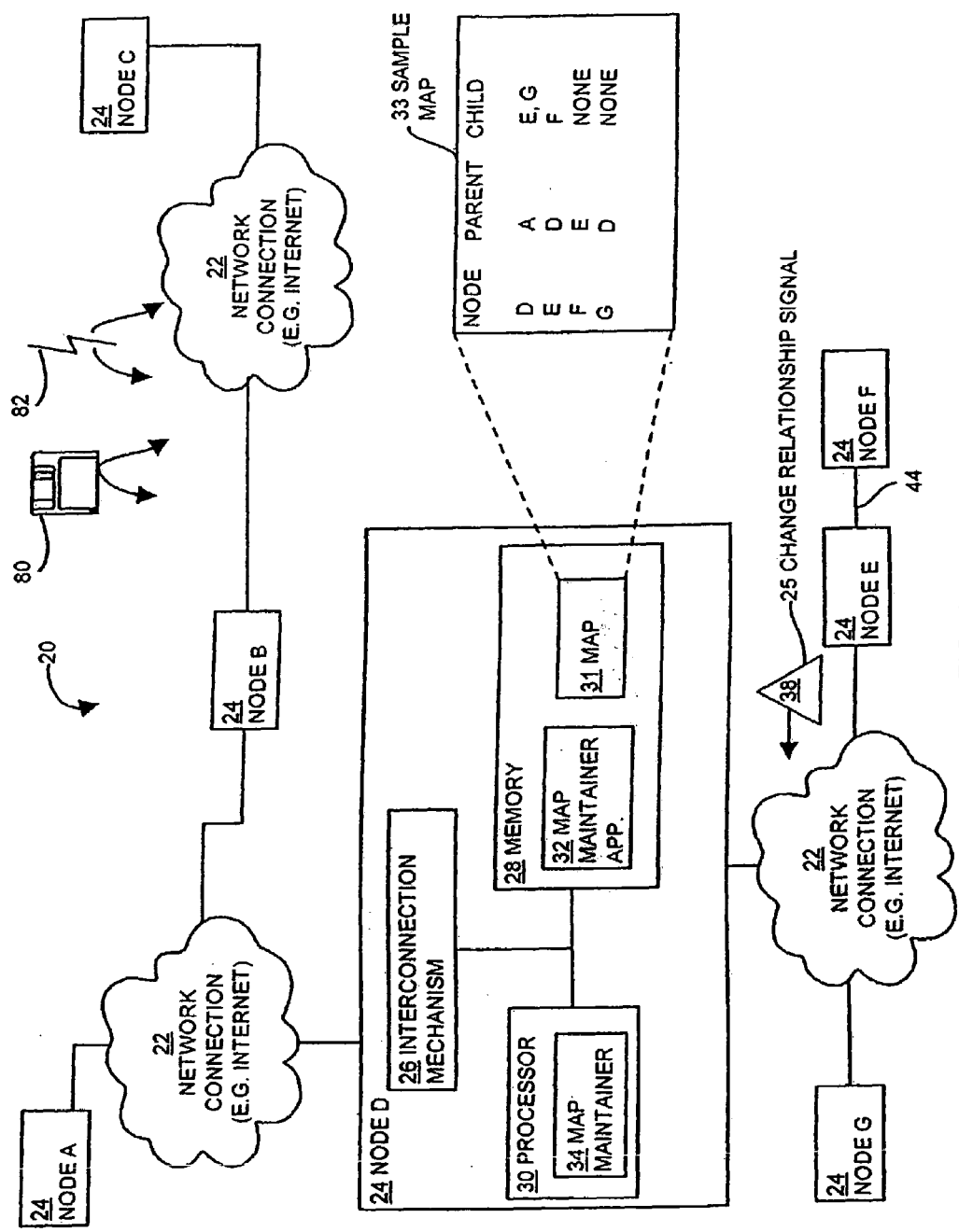
FIG. 1 illustrates data transfers in an example of a network of nodes configured to operate in accordance with embodiments of the invention.

FIG. 1 illustrates an example of a network 20 of nodes 22 (e.g., nodes 22A through 22P) and a client 26 (e.g., end user)

configured to operate in accordance with embodiments of the invention. The network 20 includes network connections 24 that provide communications among the nodes 22 in the network 20. The network connections 24 are data communication links or connections suitable for connecting computers or digital network devices. In another embodiment, the connections 24 are IP connections (e.g., TCP/IP) that provide communication over an IP network such as the Internet. In another embodiment, the connections 24 are tunneled connections using GRE, L2TP, PPPoE or other similar general-purpose packets encapsulations protocols. A node 22 (i.e., nodes 22A through 22P) is a computer system, in one embodiment of the invention. In another embodiment, the node 22 is a network device, such as a switch, router, bridge, or other network device.

One sample node, node 22C, that is configured according to an embodiment of the invention, includes a processor 30, buffer 32 (i.e., volatile memory), memory 34 (i.e., volatile memory), data storage 35 (i.e., nonvolatile memory or data storage, such as a disk), and network interface 36 that are all interconnected by internal circuitry (e.g., bus) of the node 22C. FIG. 1 also illustrates a collection of data 38 (e.g., 38-1, 38-2, 38-3, and 38-4) that represents a set of information being distributed through the nodes 22 of the network 20, as will be described in more detail below. In one embodiment, the other nodes 22 are configured in a manner similar to node 22C. The memory 34 includes instructions for a data manager application 40. The data storage 35 includes a stored collection of data 38-4. The processor 30 executes the data manager application 40 instructions to form a data manager 42 that performs the functions of transferring data through the node 22C to other nodes 22 in the network 20, as described above.

Preferably, each node 22 in the network 20 is configured in a manner similar to node 22C. That is, each node 22 includes a processor 30, a buffer 32, a memory 34, and a network interface 36 interconnected by internal circuitry (e.g., bus) of the node 22. The memory 34 in each node 22 includes a data manager application 40, and the data storage 35 includes a stored collection of data 38. The processor 30 in each node 22 executes the data manager application 40 instructions to form the data manager 42 for that node 22.

The client 26 is a computer or other electronic device capable of receiving the collection of data 38-3. The client 26 is configured to receive the collection of data 38 distributed throughout the network 20. For example, the client 26 includes a web browser (e.g., web browser logic instructions stored in a memory 34 of the client 26 that execute on a processor 30 of the client 26) that receives the collection of data 38 (e.g., stream of video data) for presentation on a display of the client 26 to a user of the client 26.

The collection of data 38 represents a set of information (e.g., digital data or analog signals) that is distributed throughout the network 20. That is, the collection of data 38 represents data that forms a logical unity or entity. For example, the collection of data 38 can be a audio stream representing a song, or a video stream representing a story, music video, newscast, speech, or other video entity. In addition, the collection of data can be one or more files of digital data, such as one or more files providing a software application or an update to a software application executing on a client 26. Furthermore, the collection of data 38 can be a subset of a larger set of data. For example, if a stream of video data is very large, then the collection of data 38 can represent a subset of that larger stream.

The collection of data 38-1 represents data being distributed through the network 20 and received at the node 22C. The collection of data 38-1 may be incorporated in a transmission signal or encompassed in one or more packets for distribution over the network 20. The collection of data 38-2 is data that is stored in a buffer 32 (e.g., volatile memory) based on the collection of data 38-1 received by the node 22C. The collection of data 38-3 is a copy of the buffered collection of data 38-2 encompassed in an ongoing transmission signal or packets for distribution over the network 20 from node 22C to other nodes 22 (e.g., 22M, 22N, and 22P). The collection of data 38-4 is the stored data based on the received collection of data 38-1 that the node 22C stores in a data storage 35 (i.e., nonvolatile memory or data storage, such as a disk), after completing the transfer of the collection of data 38-3 to the other nodes 22M, 22N, and 22P.

In one embodiment, a computer program product 180 including a computer readable medium (e.g., one or more CD-ROM's, diskettes, tapes, etc.) provides software instructions (e.g., data manager application 40) for the data manager 42. The computer program product 180 can be installed by any suitable software installation procedure, as is well known in the art. In another embodiment, the software instructions can also be downloaded over a wireless connection. A computer program propagated signal product 182 embodied on a propagated signal on a propagation medium (e.g., a radio wave, an infrared wave, a laser wave, sound wave, or an electrical wave propagated over the Internet or other network) provides software instructions for the data manager 42. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 180 is a propagation medium that the computer can receive and read, such as by receiving the propagation medium and identifying a propagated signal embodied in the propagation medium, as described above for the computer program propagated signal product 182.

The additional figures and flowcharts, FIGS. 2 through 6 provide more detail on the process of distributing a collection of data 38 throughout the network 20.

Figure 2:
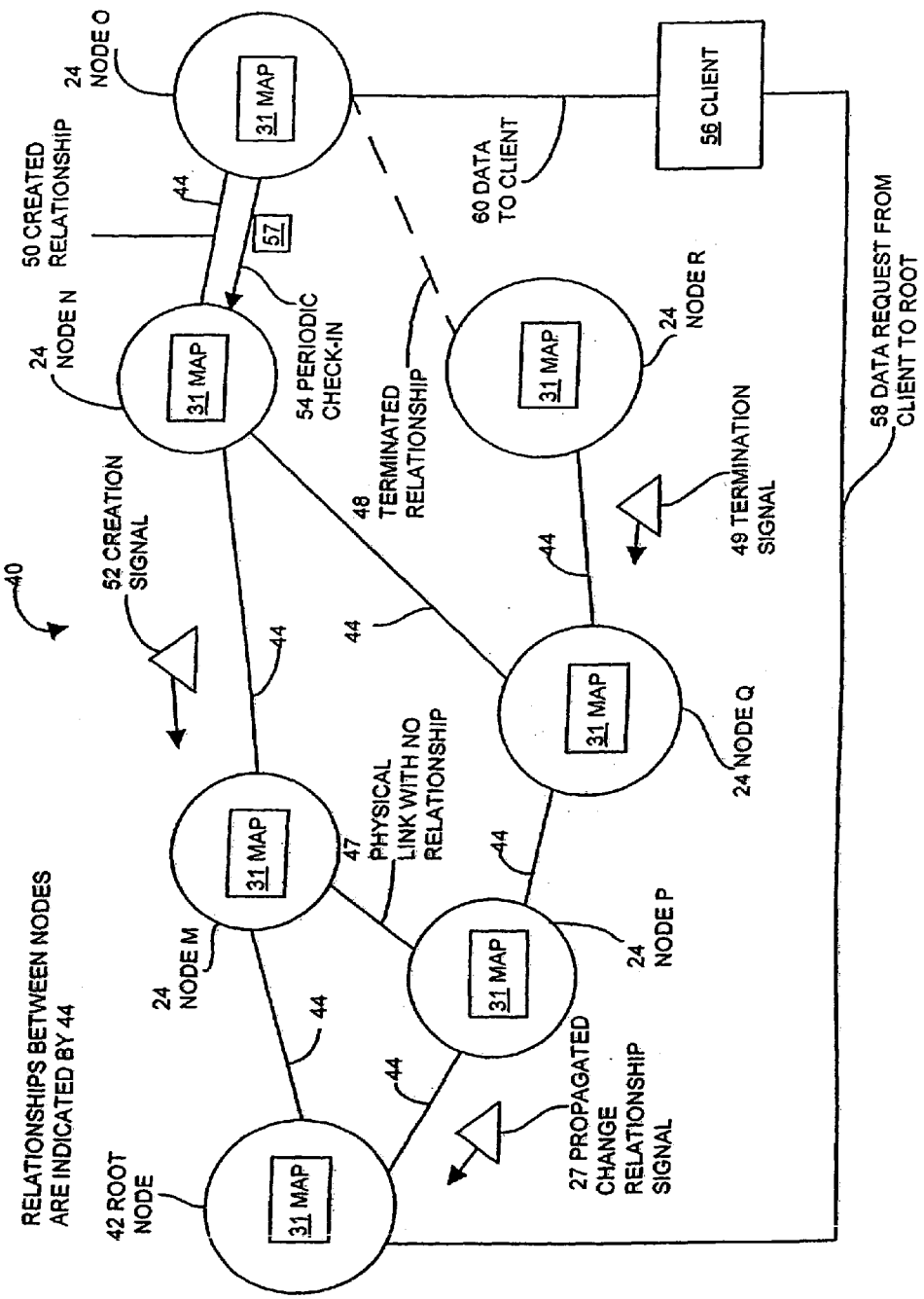
FIG. 2 is a flow chart of a procedure for passing data through a transferring node performing according to embodiments of the invention.

FIG. 2 is a flow chart of a procedure 100 for passing data (e.g., collection of data 38-1) through a transferring node 22C performing according to embodiments of the invention.

In step 102, the transferring node 22C receives a collection of data 38-1 (e.g., stream of audio or video data) from a provider node 22B in the hierarchical network 20 of nodes 22. The transferring node 22C receives the collection of data 38-1 and stores it in a buffer 32 (i.e., volatile memory) as the buffered collection of data 38-2. For example, the collection of data 38-1 originates with a root or source node 22A, which distributes the collection of data 38-1 through a network connection 24 to the child nodes 22J, 22B and 22F, which in turn distribute the collection of data 38-1 to their child nodes (i.e., from node 22J to its child node 22K, from 22B to its child node 22C, and from 22F to its child nodes 22G and 22H). The collection of data 38-1 is distributed in a real-time mode (i.e., concurrently and without substantial delay) so that one or more viewers of the collection of data 38-1 (e.g., at one or more client nodes 26) would be able to view the same collection of data 38-1 (e.g., video stream of data) concurrently (i.e., at the same time, or without substantial difference in time). The client 26 shown in FIG. 1 is an example only, and clients 26 can be attached to any node (e.g., 22A through 22P in the network 20).

In step 104, the transferring node 22C transfers a copy of the collection of data 38-3 to a child node (e.g., 22N) of the transferring node 22C in the hierarchical network of nodes 20 in response to receiving the collection of data 38-1. For example, the transferring node 22C copies the buffered collection of data 38-2 to make the copy of the collection of data 38-3 for transfer to the child node (e.g., 22N). The transferring node 22C may include with the collection of data 38-3 header information and other information suitable for transferring the collection of data 38-3 over the network (e.g., TCP/IP header information if transferring the collection of data 38-3 over the Internet). Typically, the transferring node 22C determines which of its child nodes 22M, 22N, and 22P are available (e.g., attempts to establish a TCP connection with each child node 22M, 22N and 22P) and transfers the copy of the collection of data 38-3 to each available child node (e.g., 22M, 22N, and 22P) in a concurrent manner (e.g., with no or minimal delay between each transmission to the child nodes 22M, 22N, and 22P). It should be understood that other protocols such as GRE and L2TP are suitable for use as well.

In step 106, the transferring node 22C stores the collection of data 38-4 in a data storage 35 after completing the transfer of the copy of the collection of data 38-3 as described in step 104. For example, the transferring node 22C transmits the collection of data 38-3 to the child nodes 22M, 22N, and 22P, and then moves the collection of data 38-2 from the buffer 32 to the collection of data 38-4 that is stored on the data storage 35, such as a disk.

Figure 3:
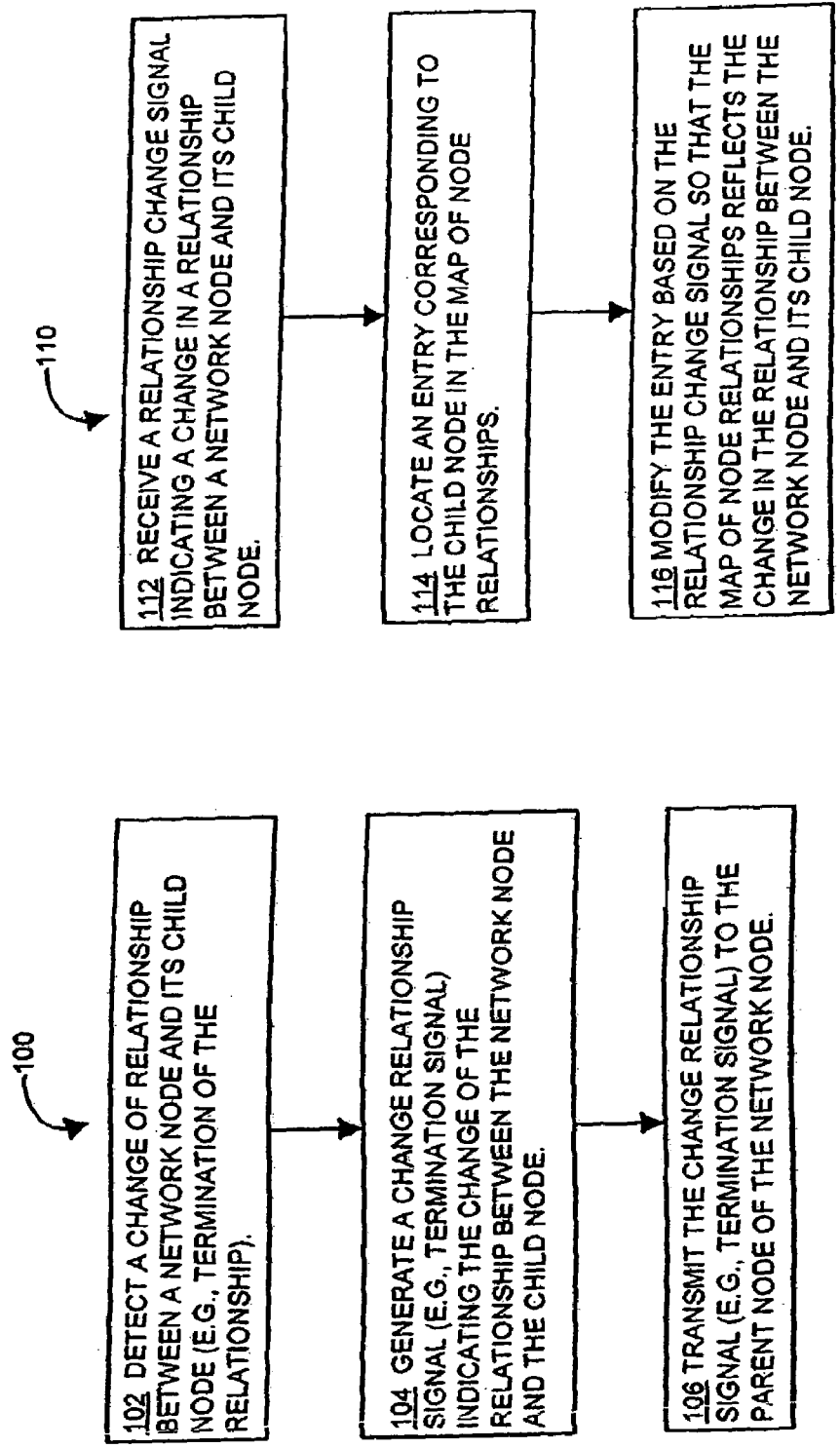
FIG. 3 illustrates requests for data in an example of a network of nodes configured to operate in accordance with embodiments of the invention.

FIG. 3 illustrates requests 68 (e.g., 68-1 through 68-3) for data in an example of a network 60 of nodes 62 (e.g., nodes 62A through 62J) configured to operate in accordance with embodiments of the invention. The network 60 is an example of an overlay network based on relationships 44 (virtual links) based on underlying network connections 24 such as those shown in the network 20 of FIG. 1.

The nodes 62 are examples of the nodes 22. Preferably, each node 62 in the network 60 is configured in a manner similar to node 22C. That is, each node 62 includes a processor 30, a buffer 32, a memory 34, and a network interface 36 interconnected by internal circuitry (e.g., bus) of the node 62, as described for node 22C in FIG. 1. The memory 34 in each node 62 includes a data manager application 40, and the data storage 35 includes a stored collection of data 38. The processor 30 in each node 62 executes the data manager application 40 instructions to form the data manager 42 for that node 62.

The nodes 62 in the network 60 are connected by relationships 44. In one embodiment, the relationships 44 logical or virtual relationships, such as periodic or intermittent data connections using TCP, GRE, L2TP, or other similar means of transferring encapsulated data. The relationships 44 may be based on connections 24, such as shown in FIG. 1, but the relationships 44 do not have to parallel or match the connections 24. A relationship 44, such as the relationship 44 between node 62A and 62B, can be based on one or more connections on the Internet. For example, the relationship 44 is based on one or more physical connections involving one or more "hops" or intermediary devices, such as routers, between nodes 62A and 62B.

Clients 64 (e.g., 64A through 64E) are examples of the client 26, and represent client computers or other devices that a user can use to access data distributed throughout the network 60. For example, the user of a client 64 can use the visual display of the client 64 to view video data distributed as a collection of data 38-3 throughout the network 60.

The requests 68 (e.g., 68-1 through 68-3) are requests transferred using relationships 44 between two nodes 62. For example, a request 68-1 is an HTTP (Hypertext Transfer Protocol) request from a node 62H to obtain missing packets of data (e.g., a portion or subset of the collection of data 38-5) after the transfer of a collection of data 38-3 from node 62D to 62H, as will be discussed in more detail for FIG. 4. In another example, a request 68-2 is an HTTP request from a node 62J to obtain copy of the collection of data 38-6 from the node 62D after the initial distribution of the collection of data 38-3 (e.g., because node 62J established a relationship 44 with node 62D after the initial distribution of the collection of data 38-3), as will be discussed in more detail for FIG. 5.

Figure 4:
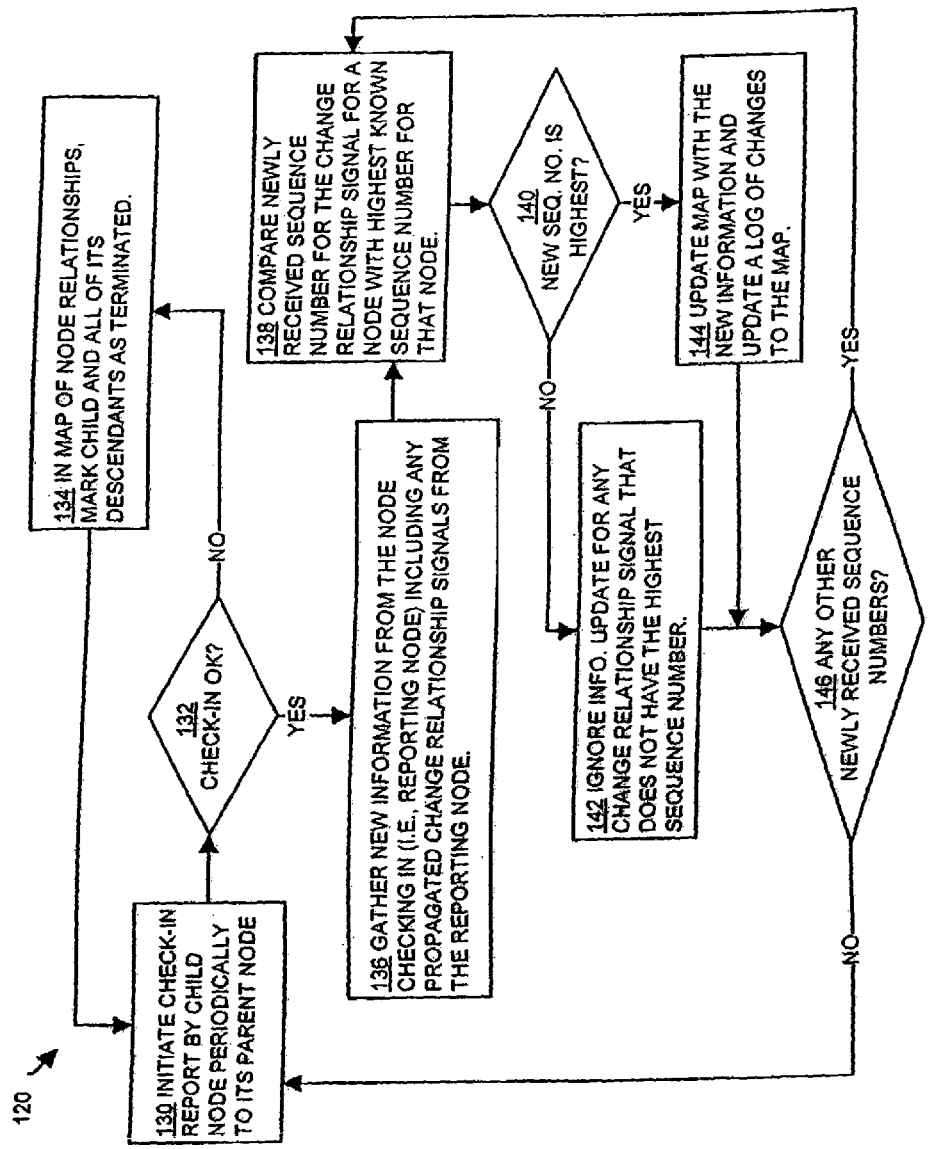
FIG. 4 is a flow chart of a procedure for providing missing data after the distribution of the collection of data to a network according to embodiments of the invention.

FIG. 4 is a flow chart of a procedure 200 for providing missing data after the distribution of the collection of data 38-3 to a network 60 according to embodiments of the invention. In step 202, a child or receiving node 62 receives packets for the collection of data 38 (e.g., stream of video data) from a transferring node 62 (i.e., parent of the receiving node). For example, node 62H receives a stream of packets for a collection of data 38 (e.g., stream of video data) from node 62D. In a concurrent time frame, nodes 62 (e.g., nodes 62B and 62E) are distributing the same collection of data 38 throughout the network 60. For example, the collection of data 38 originates from node 62A, which is a source or root node, including the original or a "first" copy of the collection of data, to be distributed to the child nodes, 62B and 62E of the node 62A, and from these child nodes, 62B and 62E, to their child nodes 62C, 62D, and 62F, and in a similar manner from parent node to child node throughout the network 60.

In step 204, the receiving node 62 determines whether all packets of the collection of data 38 have been received for a complete collection of data 38. In other words, the receiving node 62 determines if there are any missing packets that the receiving node 62 did not receive, thus indicating that the collection of data 38 is incomplete. For example, the receiving node 62H, as shown in FIG. 3, receives packets for a collection of data 38 from the transferring node 62D and, after the transfer of the collection of data 38, determines that some packets that should have been received have not been. In one approach, the packets are numbered in a sequential manner (e.g., sequence numbers) that enables the receiving node 62H to determine that one or more packets are missing after receiving the other packets for the collection of data 38.

In some network protocols, data is distributed (e.g., throughout a network) without a strict requirement that each packet of data be confirmed during the distribution, such as when using an unreliable transport protocol, such as UDP (User Datagram Protocol) or RTP (Real-time Transport Protocol), which are preferred because they provide for a faster distribution of the data than a reliable protocol such as the "handshaking" protocol of TCP that confirms the transmission of each packet. Thus, in a conventional multicast distribution approach, nodes 62 can distribute the packets of data in a network 60 without accounting for every packet of data. In such a conventional approach, in a video distribution, if too many packets of data can be lost, the result is a significant effect on the video as displayed at a client 64 (e.g., interrupted movement or frozen images in the video).

In one embodiment of the invention, as described herein for step 204, a receiving node 62 checks to determine whether all packets have been received, regardless of the protocol used. In other words, the nodes 62 can distribute the collection of data 38 using an unreliable transport protocol, but the nodes 62 can still check for missing packets, and request their replacement, as described below for step 206. Also, the nodes 62 can distribute a collection of data 38 requiring reliable transfers (e.g., bit for bit reliability), such as for a file of software code, using the same approach, as described herein, to insure reliable transfer of all packets of the collection of data 38, even if a fast, unreliable transport mechanism is used, such as UDP (User Datagram Protocol) or RTP (Real-time Transport Protocol)

In step 206, the receiving node 62 decides whether it needs to request any missing packets, based on the criteria described above for step 204.

In step 208, the receiving node 62 sends a request 68 (e.g., HTTP request over the Internet) to request any packets of data missing from the collection of data 38 received from node 62. For example, the receiving node 62H sends a request 68-1 to node 62D to request the missing packets of data from the transferring node 62D.

In step 210, the receiving node 62 receives additional (e.g., missing) packets of data from the transferring node 62. For example, node 62D receives the request 68-1 from node 62H and retrieves copies of the missing packets of data from the stored collection of data 38-3 stored on data storage 35 in node 62D. The transferring node 62D then transmits the copies of the missing packets of data as collection of data 38-5 to receiving node 62H. The receiving node 62H receives the collection of data 38-5 (i.e., the missing packets of data) and returns to step 204 to determine if any packets of data are still missing that are needed to have a complete collection of data 38.

If in step 206 the receiving node 62 determines that there is no need to request any missing packets, the receiving node 62 proceeds to step 212 and provides an acknowledgment to the transferring node 62 that the collection of data is complete. For example, the receiving node 62H determines that no more packets of data are needed to complete the collection of data 38 and sends an acknowledgment to node 62D.

Figure 5:
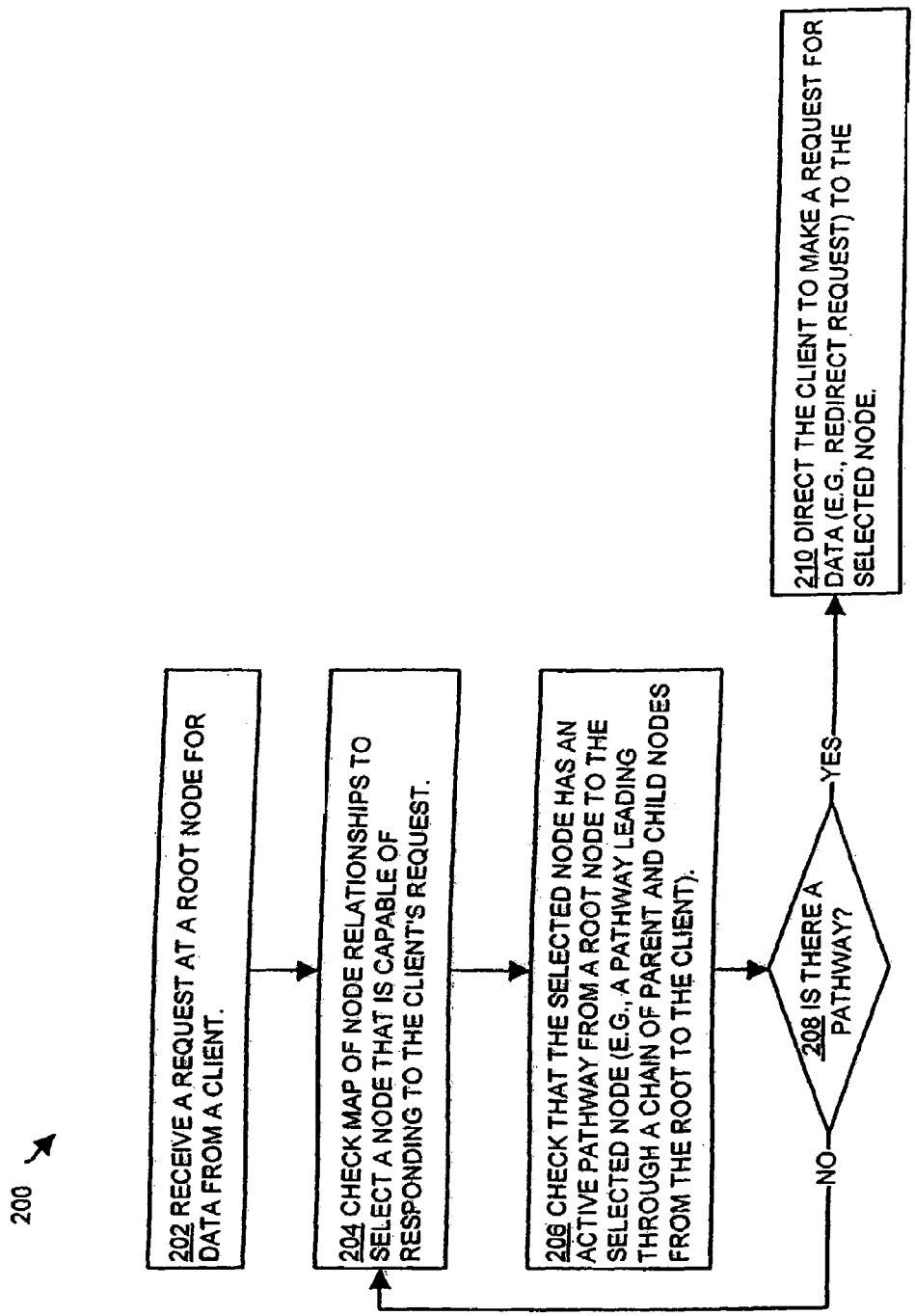
FIG. 5 is a flow chart of a procedure for requesting a collection of data after the initial distribution of the data to a network according to embodiments of the invention.

FIG. 5 is a flow chart of a procedure 300 for requesting a collection of data 38 after the distribution of the data to a network 60 according to embodiments of the invention. In step 302, a node 62 receives a request 68 from a client 64 for the collection of data 38 (e.g., video data). For example, after the nodes 62 have distributed a collection of data 38 throughout the network 60, node 62J receives a request 68-2 for the collection of data 38 from a client 64E which is attached to node 62J. In this example, node 62J attached to the network 60 after the distribution of the collection of data 38 throughout the network 60, and thus does not have a copy of the collection of data 38.

In step 304, a node 62 requests the retrieval of the collection of data 38 from a transferring node 62 that has the collection of data 38 stored in data storage 35 on the transferring node 62. For example, node 62J makes a request 68-3 based on the client's request 68-2 for the retrieval of the collection of data 38-6 from data storage 35 on the transferring node 62D.

In step 306, a node 62 receives the collection of data 38 (e.g., stream of video data) from storage on the transferring node 62. For example, node 62D retrieves a collection of data from data storage 35 on node 62D and transmits a copy of the collection of data 38-6 to node 62J, which receives the copy of collection of data 38-6. In this example, node 62J stores the collection of data 38-6 in data storage 35 on node 62J.

In step 308, a node 62 provides the collection of data 38 (e.g., stream of video data) to the client 64. For example, node 62J makes a copy of the collection of data 38-6 stored in data storage 35 on node 62J and sends the copy of the collection of data 38-7 to the client 64E.

Thus, a node 62 can provide the collection of data 38 after it has been distributed throughout the network 60 to respond to a new request 68 for the collection of data 38. This means that the distribution of the collection of data 38 is not required to occur only in a real-time mode (i.e., concurrent or without substantial delay) but the distribution of the collection of data 38 can occur in a delayed timing mode (i.e., some copies of the collection of data 38 can be distributed through parts of the network 60 with a substantial delay or in a different time frame from other copies of the collection of data 38 that are distributed through other parts of the network 60).

In addition, the bandwidth of the network 60 as a whole can be maximized because the collection of data 38 can be distributed to some clients 64 in a real-time mode and distributed to other clients 64 in a delayed timing mode. For example, node 62H can distribute a copy of the collection of data 38 to one client 64C in a real-time mode, store the collection of data 38 on node 62H, and then distribute another copy of the collection of data 38 based on the stored collection of data 38 to another client (e.g., 64D) in a delayed timing mode (e.g., without substantial delay after distributing the copy of the collection of data 38 to client 64C).

Figure 6:
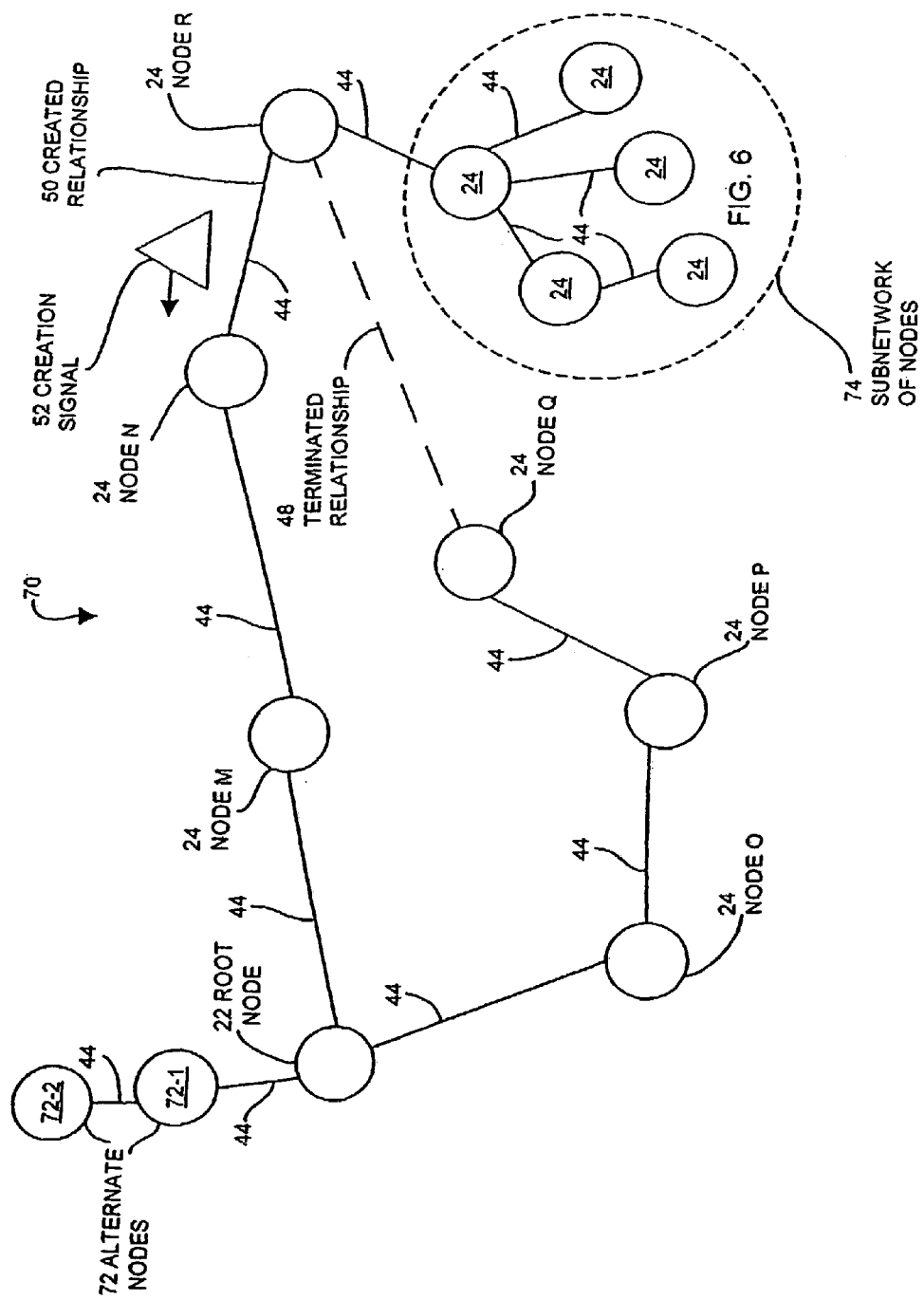
FIG. 6 illustrates the distribution of data throughout an example of a network of nodes configured to operate in accordance with embodiments of the invention.

FIG. 6 illustrates the distribution of data throughout an example of a network 80 of nodes 62 configured to operate in accordance with embodiments of the invention. The network 80 is an example of an overlay network based on relationships 44 (e.g., 44-1 through 44-6) as shown in FIG. 6. The relationships 44 can be based on underlying network connections 24, such as those as shown in the network 20 of FIG. 1.

As shown in FIG. 6, a network administrator or other user provides a source or original collection of data 38-10 and stores the collection of data 38-10 on a source or root node 62A. For example, the network administrator loads the collection of data 38-10 from a storage medium (e.g., video or audio clip from a CD-ROM) onto the source node 62A. In another example, the network administrator can provide for a live-feed (e.g., from a video camera recording a speech occurring in real time) that provides the collection of data 38-10 to the source node 62A. In a further example, a network administrator can load a file (e.g., update file for a software application) from a storage medium (e.g., CD-ROM) to serve as the source collection of data 38-10. In addition, a network administrator can load the collection of data 38-10 over a network onto node 62A.

The source node 62A then copies the source collection of data 38-10 to copies of the collection of data 38-11 for distribution to the child nodes 62B and 62E of node 62A. Nodes 62B and 62E then each receive a copy of the collection of data 38-11 in the respective buffers 32 for each node 62B and 62E.

The transferring node 62B then copies the collection of data 38-11 from the buffer 32 to copies of the collection of data 38-12 for distribution to the child nodes 62C and 62D of node 62B. Then node 62B moves the collection of data 38-11 from the buffer 32 to data storage 35 on node 62B, after transferring the collection of data 38-12. In another embodiment, the node 62B copies the collection of data 38-11 to data storage 23 on node 62B while concurrently sending the collection of data 38-12 to the child nodes 62C and 62D. Concurrently, as used herein, means performing two operations at substantially the same time; that is, one operation is performed immediately after the other one on a processor 30 with no substantial delay, the two operations may be time sliced into suboperations that are performed on the processor 30 in alternate time slices, the two operations are performed in parallel (e.g., if the processor 30 is an assembly or system including two sets of circuits or subprocessors that can perform operations in parallel), or some other approach, as is known in the art, that enables a node 62 to perform operations in a concurrent time frame (e.g., in a time frame of seconds).

The transferring node 62E then copies the stored collection of data 38-11 to a copy of the collection of data 38-13 for distribution to the child node 62F of node 62E. The child node 62F then stores a copy of the collection of data 38-13 in the data storage 35 for node 62F.

Using the approach illustrated in FIG. 6, each transferring node 62 can provide a copy of the collection of data 38 to one or more child nodes 62 of that transferring node 62, while retaining a collection of data 38 in data storage (e.g., disk) on the transferring node 62. The collection of data 38 is available after the transfer of copies of the collection of data 38 to other nodes 62. Thus, in one example in reference to FIG. 6, if the nodes 62 distribute the collection of data 38 using an unreliable transport mechanism, as described previously, then the a child node 62 can request a subset of the collection of data 38 (i.e., missing data or lost packets as for 38-5 described above for FIG. 4) from the data storage 35 of the transferring node 62, even if there is substantial delay in time (e.g., seconds, minutes, hours, days, or longer) after the completion of the transfer of the collection of data 38 from the transferring node 62 to the child node 62. In an additional example in reference to FIG. 6, if a new node 62 attaches itself to the network 80, the new node 62 can attach to any node 62A through 62F and request a copy of the collection of data 38 from any of these nodes 62A through 62F, because each node 62A through 62F retains a copy of the collection of data 38 in each respective data storage 35 for each of these nodes 62A through 62F.

In addition, in reference to FIG. 6, if one relationship 44-2 (e.g., the relationship between node 62A and 62B) has a very high bandwidth and another relationship 44-3 (e.g., the relationship between node 62B and 62D) has a low bandwidth, then the transferring node (e.g., 62B) can store the collection of data 38-11 (or subsets of the collection 38-11) in the data storage 35 for node 62B (because the amount of data received may exceed a typical buffer 32). Then the transferring node (e.g., 62B) can transmit a copy of the collection of data 38-12 over the low bandwidth relationship 44-3 from the data storage 35 of the transferring node (e.g., 62B) so that the receiving node (e.g., 62B) receives the collection of data 38-12 without interruption or undue delay that might occur if node 62B attempted to use only its buffer 32 to receive the high bandwidth input (e.g., collection of data 38-11) over the high bandwidth relationship 44-2.

Furthermore, in reference to FIG. 6, if a transferring node (e.g., 62E) becomes unavailable (e.g., due to an interrupted physical connection or system failure of that node 62E), then the receiving node (e.g., 62F) can continue to receive the collection of data 38 by contacting its grandparent (e.g., 62A) or another node (e.g., 62B) that has a stored copy of the collection of data 38 (e.g., 38-10 stored on node 62A, or 38-11 stored on node 62B). For example, if the node 62F loses its relationship 44-5 between node 62E and 62F, then node 62F can attempt to establish a new relationship 44-1 with node 62A. Thus, if a receiving node (e.g., 62F) is, in turn, distributing a copy of the collection of data 38-14 to a client (e.g., client 64F) then the node (e.g., 62F) can continue the distribution without interruption (or with a limited interruption). For example, after starting to distribute a copy of the collection of data 38-14 to client 64F and losing the relationship 44-5, node 62F can establish a new relationship 44-1 with node 62A, and can continue to distribute the copy of the collection of data 38-14 to a client 64F based on copying the collection of data 38-10 stored on node 62A using the relationship 44-6. See the discussion of tree building protocols in the section below.

While this invention has been particularly shown and described with references to preferred embodiments thereof, it will be understood by those skilled in the art that various changes in form and details may be made therein without departing from the spirit and scope of the invention as defined by the claims below.

For example, the invention is suitable for use with a network 60 of nodes 62 that are connected by any suitable underlying physical connections, such as a local area network (LAN), modem connections, channel connections, or other connections. In addition, a node 22 or node 62 can be any communicating entity, such as a computer or other electronic device, software module, or humans.

In addition, a source node 62A (e.g., node that distributes video data throughout the network 60) is not required to be at the root of a tree of nodes 62, but can be a node 62 located elsewhere in the network 60. Also, the network 60 is not required to be a tree, but can have other structures (e.g., having relationships 44 that form cross links among branches in the tree, or form cyclic patterns of links in the network 60) forming a graph of nodes 62 that is not a tree.

In another example, data storage 35 can be any type of nonvolatile memory or data storage suited for use with computers and electronic devices. Thus, the data storage 35 can be a disk, tape, writeable CD-ROM, writeable read-only memory (e.g., electronically erasable programmable read-only memory or EEPROM) that is nonvolatile memory and can retain data in stable data storage without any requirement for ongoing or continuous electrical power. In another example, the data storage 35 can be a memory with a reliable configuration that is configured for stable, long term data storage (e.g., a random access memory or RAM that relies one or more fail-safe power sources, generators, batteries, capacitors, backup copies and/or fail-safe approach).

In another example, the buffer 32 and memory 34 can be combined in one volatile memory (e.g., RAM). In a further example, data storage 35 can include the data manager application 40 stored on the data storage 35, and processor 30 can read the instructions of the data manager application 40 from the data storage 35 and execute the instructions on the processor 30 to form the data manager 42, as described previously. In an additional example, the buffer 32 can be a cache buffer, volatile cache memory, registers, or volatile memory that is part of the processor 30 (e.g., included on the same IC as the processor 30).

Furthermore, a client, 26 or 64, can be any type of electronic device suited to make a request 68 for a collection of data 38. For example, a client 26 or 64 can be a desktop computer, a laptop computer, a palmtop computer, a mobile phone, or other electronic or communications device. A request 68 can be originated by a human user or by the client, 26 or 64, itself. For example, a client, 26 or 64, can determine through a timing mechanism that a software application executing on the client, 26 or 64, should be updated (e.g., monthly update to the database for a virus detection application) and thus makes a request 68 to a node 62 having an update file (e.g., update file for the virus detection database).

The section below is entitled "Overcast: Reliable Multicasting with an Overlay Network", and provides an example of a system that uses one approach of the invention and is meant to be considered as part of the detailed disclosure of embodiments of the invention. The system described below, however, is to be considered as an example only, and it is to be understood that this example is not meant to be limiting of the invention.

Overcast: Reliable Multicasting with an Overlay Network

Overcast is an application-level multicasting system that can be incrementally deployed using today's Internet infrastructure. These properties stem from Overcast's implementation as an overlay network. An overlay network consists of a collection of nodes placed at strategic locations in an existing network fabric. These nodes implement a network abstraction on top of the network provided by the underlying substrate network.

Overcast provides scalable and reliable single-source multicast using a simple protocol for building efficient data distribution trees that adapt to changing network conditions. To support fast joins, Overcast implements a new protocol for efficiently tracking the global status of a changing distribution tree.

Results based on simulations confirm that Overcast provides its added functionality while performing competitively with IP Multicast. Simulations indicate that Overcast quickly builds bandwidth-efficient distribution trees that, compared to IP Multicast, provide 70%–100% of the total bandwidth possible, at a cost of somewhat less than twice the network load. In addition, Overcast adapts quickly to changes caused by the addition of new nodes or the failure of existing nodes without causing undue load on the multicast source.

1 Introduction

Overcast is motivated by real-world problems faced by content providers using the Internet today. How can bandwidth-intensive content be offered on demand? How can long-running content be offered to vast numbers of clients? Neither of these challenges are met by today's infrastructure, though for different reasons. Bandwidth-intensive content (such as 2 Mbit's video) is impractical because the bottleneck bandwidth between content providers and consumers is considerably less than the natural consumption rate of such media. With currently available bandwidth, a 10-minute news clip might require an hour of download time. On the other hand, large-scale (thousands of simultaneous viewers) use of even moderate-bandwidth live video streams (perhaps 128 Kbit's) is precluded because network costs scale linearly with the number of consumers.

Overcast attempts to address these difficulties by combining techniques from a number of other systems. Like IP Multicast, Overcast allows data to be sent once to many destinations. Data are replicated at appropriate points in the network to minimize bandwidth requirements while reaching multiple destinations. Overcast also draws from work in caching and server replication. Overcast's multicast capabilities are used to fill caches and create server replicas throughout a network. Finally Overcast is designed as an overlay network, which allows Overcast to be incrementally deployed. As nodes are added to an Overcast system the system's benefits are increased, but Overcast need not be deployed universally to be effective.

An Overcast system is an overlay network consisting of a central source (which may be replicated for fault tolerance), any number of internal Overcast nodes (standard PCs with permanent storage) sprinkled throughout a network fabric, and standard HTTP clients located in the network. Using a simple tree-building protocol, Overcast organizes the internal nodes into a distribution tree rooted at the source. The tree-building protocol adapts to changes in the conditions of the underlying network fabric. Using this distribution tree, Overcast provides large-scale, reliable multicast groups, especially suited for on-demand and live data delivery. Overcast allows unmodified HTTP clients to join these multicast groups.

Overcast permits the archival of content sent to multicast groups. Clients may specify a starting point when joining an archived group, such as the beginning of the content. This feature allows a client to "catch up" on live content by tuning back ten minutes into a stream, for instance. In practice, the nature of a multicast group will most often determine the way it is accessed. A group containing stock quotes will likely be accessed live. A group containing a software package will likely be accessed from start to finish; "live" would have no meaning for such a group. Similarly, high-bandwidth content can not be distributed live when the bottleneck bandwidth from client to server is too small. Such content will always be accessed relative to its start.

We have implemented Overcast and used it to create a data distribution system for businesses. Most current users distribute high quality video that clients access on demand. These businesses operate geographically distributed offices and need to distribute video to their employees. Before using Overcast, they met this need with low resolution Web accessible video or by physically reproducing and mailing VHS tapes. Overcast allows these users to distribute high-resolution video over the Internet. Because high quality videos are large (Approximately 1 Gbyte for a 30 minute MPEG-2 video), it is important that the videos are efficiently distributed and available from a node with high bandwidth to the client. To a lesser extent, Overcast is also being used to broadcast live streams. Existing Overcast networks typically contain tens of nodes and are scheduled to grow to hundreds of nodes.

The main challenge in Overcast is the design and implementation of protocols that can build efficient, adaptive distribution trees without knowing the details of the substrate network topology. The substrate network's abstraction provides the appearance of direct connectivity between all Overcast nodes. Our goal is to build distribution trees that maximize each node's bandwidth from the source and utilize the substrate network topology efficiently. For example, the Overcast protocols should attempt to avoid sending data multiple times over the same physical link. Furthermore, Overcast should respond to transient failures or congestion in the substrate network.

Figure 7:
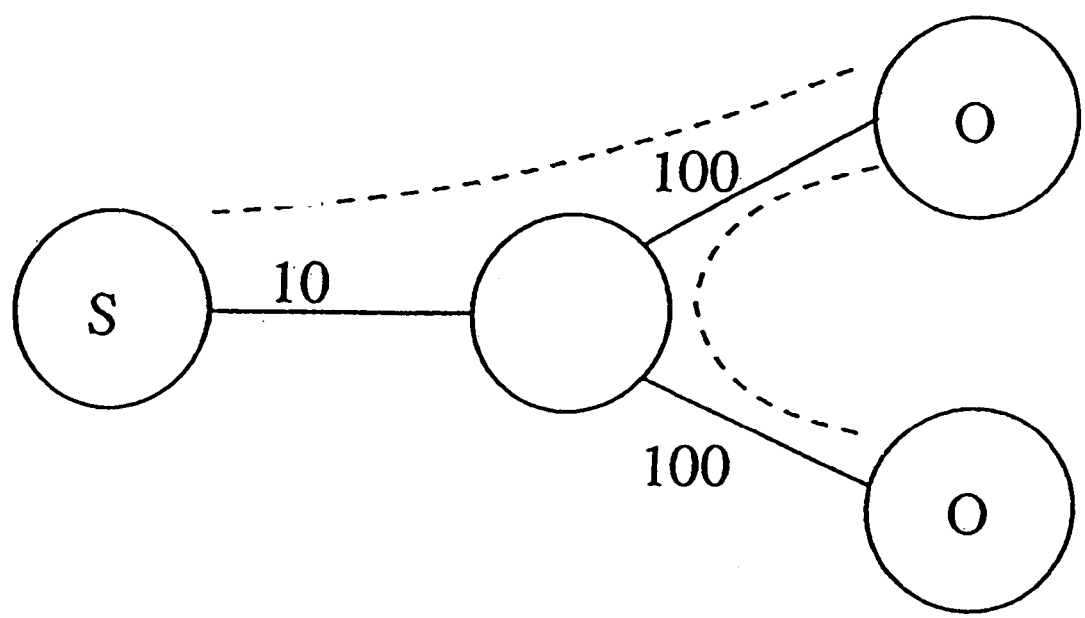
FIG. 7 is a diagram of an example network and Overcast topology.

Consider the simple network depicted in FIG. 7, which is an example network and Overcast topology. The straight lines are the links in the substrate network. These links are labeled with bandwidth in Mbit's. The curved lines represent connections in the Overlay network. S represents the source, O represents two Overcast nodes.

The network substrate consists of a root node (R), two Overcast nodes (O), a router, and a number of links. The links are labeled with bandwidth in Mbit's. There are three ways of organizing the root and the Overcast nodes into a distribution tree. The organization shown optimizes bandwidth by using the constrained link only once.

The contributions of this paper are:

- A novel use of overlay networks. We describe how reliable, highly-scalable, application-level multicast can be provided by adding nodes that have permanent storage to the existing network fabric.
- A simple protocol for forming efficient and scalable distribution trees that adapt to changes in the conditions of the substrate network without requiring router support.
- A novel protocol for maintaining global status at the root of a changing distribution tree. This state allows clients to join an Overcast group quickly while maintaining scalability.
- Results from simulations that show Overcast is efficient. Overcast can scale to a large number of nodes; its efficiency approaches router-based systems; it quickly adjusts to configuration changes; and a root can track the status of an Overcast network in a scalable manner.

Section 2 details Overcast's relation to prior work. Overcast's general structure is examined in Section 3, first by describing overlay networks in general, then providing the details of Overcast. Section 4 describes the operation of the Overcast network performing reliable application-level multicast. Finally, Section 5 examines Overcast's ability to build a bandwidth-efficient overlay network for multicasting and to adapt efficiently to changing network conditions.

2 Related Work

Overcast seeks to marry the bandwidth savings of an IP Multicast distribution tree with the reliability and simplicity of store-and-forward operation using reliable communication between nodes. Overcast builds on research in IP multicast, content distribution (caching, replication, and content routing), and overlay networks. We discuss each in turn.

IP Multicast IP Multicast is designed to provide efficient group communication as a low level network primitive. Overcast has a number of advantages over IP Multicast. First, as it requires no router support, it can be deployed incrementally on existing networks. Second, Overcast provides bandwidth savings both when multiple clients view content simultaneously and when multiple clients view content at different times. Third, while reliable multicast is the subject of much research, problems remain when various links in the distribution tree have widely different bandwidths. A common strategy in such situations is to decrease the fidelity of content over lower bandwidth links. Although such a strategy has merit when content must be delivered live, Overcast also supports content types that require bit-for-bit integrity, such as software.

Content Distribution Systems Others have advocated distributing content servers in the network fabric, from initial proposals to larger projects, such as Adaptive Caching, Push Caching, Harvest, Dynamic Hierarchical Caching, Speculative Data Dissemination, and Application-Level Replication. Overcast extends this previous work by building an overlay network using a self-organizing algorithm. This algorithm, operating continuously, not only eliminates the need for manually determined topology information when the overlay network is created, but also reacts transparently to the addition or removal of nodes in the running system. Initialization, expansion, and fault tolerance are unified.

A number of service providers (e.g., Adero, Aka-mai, and Digital Island) operate content distribution networks, but in-depth information describing their internals is not public information. FastForward's product is described below as an example of an overlay network.

Overlay Networks A number of research groups and service providers are investigating services based on overlay networks. In particular, many of these services, like Overcast, exist to provide some form of multicast or content distribution. These include End System Multicast, Yoid (formerly Yallcast), X-bone, RMX, FastForward, and PRISM. All share the goal of providing the benefits of IP multicast without requiring direct router support or the presence of a physical broadcast medium. However, except Yoid, these approaches do not exploit the presence of permanent storage in the network fabric.

End System Multicast is an overlay network that provides small-scale multicast groups for teleconferencing applications; as a result the End System Multicast protocol (Narada) is designed for multisource multicast. The Overcast protocols different from Narada in order to support large-scale multicast groups.

X-bone is also a general-purpose overlay network that can support many different network services. The overlay networks formed by X-bone are meshes, which are statically configured.

RMX focuses on real-time reliable multicast. As such, its focus is on reconciling the heterogeneous capabilities and network connections of various clients with the need for reliability. Therefore their work focuses on semantic rather than data reliability. For instance, RMX can be used to change high resolution images into progressive JPEGs before transmittal to underprovisioned clients. Our work is less concerned with interactive response times. Overcast is designed for content that clients are interested in only at full delity, even if it means that the content does not become available to all clients at the same time.

FastForward Networks produces a system sharing many properties with RMX. Like RMX, FastForward focuses on real-time operation and includes provisions for intelligently decreasing the bandwidth requirements of rich media for low-bandwidth clients. Beyond this, FastForward's product differs from Overcast in that its distribution topology is statically configured by design. Within this statically configured topology, the product can pick dynamic routes. In this way FastForward allows experts to configure the topology for better performance and predictability while allowing for a limited degree of dynamism. Overcast's design seeks to minimize human intervention to allow its overlay networks to scale to thousands of nodes. Similarly, FastForward achieves fault tolerance by statically configuring distribution topologies to avoid single points of failure, while Overcast seeks to dynamically reconfigure its overlay in response to failures. Active Networks One may view overlay networks as an alternative implementation of active networks. In active networks, new protocols and application-code can dynamically be downloaded into routers, allowing for rapid innovation of network services. Overcast avoids some of the hard problems of active networks by focusing on a single application; it does not have to address the problems created by dynamic downloading of code and sharing resources among multiple competing applications. Furthermore, since Overcast requires no changes to existing routers, it is easier to deploy. The main challenge for Overcast is to be competitive with solutions that are directly implemented on the network level.

3 The Overcast Network

This section describes the overlay network created by the Overcast system. First, we argue the benefits and drawbacks of using an overlay network. After concluding that an overlay network is appropriate for the task at hand, we explore the particular design of an overlay network to meet Overcast's demands. To do so, we examine the key design requirement of the Overcast network—single source distribution of bandwidth-intensive media on today's Internet infrastructure. Finally we illustrate the use of Overcast with an example.

3.1 Why Overlay?

Overcast was designed to meet the needs of content providers on the Internet. This goal led us to an overlay network design. To understand why we chose an overlay network, we consider the benefits and drawbacks of overlays. An overlay network provides advantages over both centrally located solutions and systems that advocate running code in every router. An overlay network is:

Incrementally Deployable An overlay network requires no changes to the existing Internet infrastructure, only additional servers. As nodes are added to an overlay network, it becomes possible to control the paths of data in the substrate network with ever greater precision.

Adaptable Although an overlay network abstraction constrains packets to over a constrained set of links, that set of links is constantly being optimized over metrics that matter to the application. For instance, the overlay nodes may optimize latency at the expense of bandwidth. The Detour Project has discovered that there are often routes between two nodes with less latency than the routes offered by today's IP infrastructure. Overlay networks can find and take advantage of such routes.

Robust By virtue of the increased control and the adaptable nature of overlay networks, an overlay network can be more robust than the substrate fabric. For instance, with a sufficient number of nodes deployed, an overlay network may be able to guarantee that it is able to route between any two nodes in two independent ways. While a robust substrate network can be expected to repair faults eventually, such an overlay network might be able to route around faults immediately.

Customizable Overlay nodes may be multipurpose computers, easily outfitted with whatever equipment makes sense. For example, Overcast makes extensive use of disk space. This allows Overcast to provide bandwidth savings even when content is not consumed simultaneously in different parts of the network.

Standard An overlay network can be built on the least common denominator network services of the substrate network. This ensures that overlay traffic will be treated as well as any other. For example, Overcast uses TCP (in particular, HTTP over port 80) for reliable transport. TCP is simple, well understood, network friendly, and standard. Alternatives, such as a "home grown" UDP protocol with retransmissions, are less attractive by all these measures. For better or for worse, creativity in reliable transport is a losing battle on the Internet today. On the other hand, building an overlay network faces a number of interesting challenges. An overlay network must address:

Management complexity The manager of an overlay network is physically far removed from the machines being managed. Routine maintenance must either be unnecessary or possible from afar, using tools that do not scale in complexity with the size of the network. Physical maintenance must be minimized and be possible by untrained personnel.

The real world In the real world, IP does not provide universal connectivity. A large portion of the Internet lies behind firewalls. A significant and growing share of hosts are behind Network Address Translators (NATs), and proxies. Dealing with these practical issues is tedious, but crucial to adoption.

Inefficiency An overlay can not be as efficient as code running in every router. However, our observation is that when an overlay network is small, the inefficiency, measured in absolute terms, will be small as well—and as the overlay network grows, its efficiency can approach the efficiency of router based services.

Information loss Because the overlay network is built on top of a network infrastructure (IP) that offers nearly complete connectivity (limited only by firewalls, NATs, and proxies), we expend considerable effort deducing the topology of the substrate network.

The first two of these problems can be addressed and nearly eliminated by careful design. To address management complexity, management of the entire overlay network can be concentrated at a single site. The key to a centralized-administration design is guaranteeing that newly installed nodes can boot and obtain network connectivity without intervention. Once that is accomplished, further instructions may be read from the central management server.

Firewalls, NATs and HTTP proxies complicate Overcast's operation in a number of ways. Firewalls force Overcast to open all connections "upstream" and to communicate using HTTP on port 80. This allows an Overcast network to extend exactly to those portions of the Internet that allow web browsing. NATs are devices used to multiplex a small set of IP addresses (often exactly one) over a number of clients. The clients are configured to use the NAT as their default router. At the NAT, TCP connections are rewritten to use one of the small number of IP addresses managed by the NAT. TCP port numbers allow the NAT to demultiplex return packets back to the correct client. The complication for Overcast is that client IP addresses are obscured. All Overcast nodes behind the NAT appear to have the same IP address. HTTP proxies have the same effect.

Although private IP addresses are never directly used by external Overcast nodes, there are times when an external node must correctly report the private IP address of another node. For example, an external node may have internal children. During tree building a node must report its children's' addresses so that they may be measured for suitability as parents themselves. Only the private address is suitable for such purposes. To alleviate this complication all Overcast messages contain the sender's IP address in the payload of the message.

The final two disadvantages are not so easily dismissed. They represent the true tradeoff between overlay networks and ubiquitous router based software. For Overcast, the goal of instant deployment is important enough to sacrifice some measure of efficiency. However, the amount of inefficiency introduced is a key metric by which Overcast should be judged.

3.2 Single-Source Multicast

Overcast is a single-source multicast system. This contrasts with IP Multicast which allows any member of a multicast group to send packets to all other members of the group. Beyond the fact that this closely models our intended application domain, there are a number of reasons to pursue this particular refinement to the IP Multicast model.

Simplicity Both conceptually and in implementation, a single-source system is simpler than an any source model. For example, a single-source provides an obvious rendezvous point for group joins.

Optimization It is difficult to optimize the structure of the overlay network without intimate knowledge of the substrate network topology. This only becomes harder if the structure must be optimized for all paths.

Address space Single-source multicast groups provide a convenient alternative to the limited IP Multicast address space. The namespace can be partitioned by first naming the source, then allowing further subdivision of the source's choosing. In contrast, IP Multicast's address space is limited, and without obvious administration to avoid collisions amongst new groups.

On the other hand, a single-source model clearly offers reduced functionality compared to a model that allows any group member to multicast. As such, Overcast is not appropriate for applications that require extensive use of such a model. However, many applications which appear to need multi-source multicast, such as a distributed lecture allowing questions from the class, do not. In such an application, only one "non-root" sender is active at any particular time. It would be a simple matter for the sender to unicast to the root, which would then perform the true multicast on the behalf of the sender. A number of projects have used or advocated such an approach.

3.3 Bandwidth Optimization

Overcast is designed for distribution from a single source. As such, small latencies are expected to be of less importance to its users than increased bandwidth. Extremely low latencies are only important for applications that are inherently two-way, such as video conferencing. Overcast is designed with the assumption that broadcasting "live" video on the Internet may actually mean broadcasting with a ten to fifteen second delay. Overcast distribution trees are built with the sole goal of creating high bandwidth channels from the source to all nodes. Although Overcast makes no guarantees that the topologies created are optimal, our simulations show that they perform quite well. The exact method by which high-bandwidth distribution trees are created and maintained is described in Section 4.2.

3.4 Deployment

An important goal for Overcast is to be deployable on today's Internet infrastructure. This motivates not only the use of an overlay network, but many of its details. In particular, deployment must require little or no human intervention, costs per node should be minimized, and unmodified HTTP clients must be able to join multicast groups in the Overcast network.

To help ease the human costs of deployment, nodes in the Overcast network configure themselves in an adaptive distributed tree with a single root. No human intervention is required to build efficient distribution trees, and nodes can be a part of multiple distribution trees. Overcast's implementation on commodity PCs running Linux further eases deployment. Development is speeded by the familiar programming environment, and hardware costs are minimized by continually tracking the best price/performance ratio available in off-the-shelf hardware. The exact hardware configuration we have deployed has changed many times in the year or so that we have deployed Overcast nodes.

The final consumers of content from an Overcast network are HTTP clients. The Overcast protocols are carefully designed so that unmodified Web browsers can become members of a multicast group. In Overcast, a multicast group is represented as an HTTP URL: the hostname portion names the root of an Overcast network and the path represents a particular group on the network. All groups with the same root share a single distribution tree.

Using URLs as a namespace for Overcast groups has three advantages. First, URLs offer a hierarchical namespace, addressing the scarcity of multicast group names in traditional IP Multicast. Second, URLs and the means to access them are an existing standard. By delivering data over a simple HTTP connection, Overcast is able to bring multicasting to unmodified applications. Third, a URL's richer structure allows for simple expression of the increased power of Overcast over tradition multicast. For example, a group suffix of start=10 s may be defined to mean "begin the content stream 10 seconds from the beginning."

3.5 Example Usage

We have used Overcast to build a content distribution application for high-quality video and live streams. The application is built out of a publishing station (called a studio) and nodes (called appliances). Appliances are installed at strategic locations in their network. The appliances boot, contact their studio, and self-organize into a distribution tree, as described below. No local administration is required.

The studio stores content and schedules it for delivery to the appliances. Typically, once the content is delivered, the publisher at the studio generates a web page announcing the availability of the content. When a user clicks on the URL for published content, Overcast redirects the request to a nearby appliance and the appliance serves the content. If the content is video, no special streaming software is needed. The user can watch the video over standard protocols and a standard MPEG player, which is supplied with most browsers.

An administrator at the studio can control the overlay network from a central point. She can view the status of the network (e.g., which appliances are up), collect statistics, control bandwidth consumption, etc.

Using this system, bulk data can be distributed efficiently, even if the network between the appliances and the studio consists of low-bandwidth or intermittent links. Given the relative prices of disk space and network bandwidth, this solution is far less ex-pensive than upgrading all network links between the studio and every client.

4 Protocols

The previous section described the structure and properties of the Overcast overlay network. This section describes how it functions: the initialization of individual nodes, the construction of the distribution hierarchy, and the automatic maintenance of the network. In particular, we describe the "tree" protocol to build distribution trees and the "up/down" protocol to maintain the global state of the Overcast network efficiently. We close by describing how clients (web browsers) join a group and how reliable multicasting to clients is performed.

4.1 Initialization

When a node is first plugged in or moved to a new location it automatically initializes itself and contacts the appropriate Overcast root(s). The first step in the initialization process is to determine an IP address and gateway address that the node can use for general IP connectivity. If there is a local DHCP server then the node can obtain IP configuration directly data using the DHCP protocol. If DHCP is unavailable, a utility program can be used from a nearby workstation for manual configuration.

Once the node has an IP configuration it contacts a global, well-known registry, sending along its unique serial number. Based on a node's serial number, the registry provides a list of the Overcast networks the node should join, an optional permanent IP configuration, the network areas it should serve, and the access controls it should implement. If a node is intended to become part of a particular content distribution network, the configuration data returned will be highly specific. Otherwise, default values will be returned and the networks to which a node will join can be controlled using a web-based GUI.

4.2 The Tree Building Protocol

Self-organization of appliances into an efficient, robust distribution tree is the key to efficient operation in Overcast. Once a node initializes, it begins a process of self-organization with other nodes of the same Overcast network. The nodes cooperatively build an overlay network in the form of a distribution tree with the root node at its source. This section describes the tree-building protocol. As described earlier, the virtual links of the overlay network are the only paths on which data is exchanged. Therefore the choice of distribution tree can have a significant impact on the aggregate communication behavior of the overlay network. By carefully building a distribution tree, the network utilization of content distribution can be significantly reduced. Overcast stresses bandwidth over other conceivable metrics, such as latency, because of its expected applications. Overcast is not intended for interactive applications, therefore optimizing a path to shave small latencies at the expense of total throughput would be a mistake. On the other hand, Overcast's architecture as an overlay network allows this decision to be revisited. For instance, it may be decided that trees should have a fixed maximum depth to limit buffering delays.

The goal of Overcast's tree algorithm is to maximize bandwidth to the root for all nodes. At a high level the algorithm proceeds by placing a new node as far away from the root as possible without sacrificing bandwidth to the root. This approach leads to "deep" distribution trees in which the nodes nonetheless observe no worse bandwidth than obtaining the content directly from the root. By choosing a parent that is nearby in the network, the distribution tree will form along the lines of the substrate network topology.

The tree protocol begins when a newly initialized node contacts the root of an Overcast group. The root thereby becomes the current node. Next, the new node begins a series of rounds in which it will attempt to locate itself further away from the root without sacrificing bandwidth back to the root. In each round the new node considers its bandwidth to current as well as the bandwidth to current through each of current's children. If the bandwidth through any of the children is about as high as the direct bandwidth to current, then one of these children becomes current and a new round commences. In the case of multiple suitable children, the child closest (in terms of network hops) to the searching node is chosen. If no child is suitable, the search for a parent ends with current.

To approximate the bandwidth that will be observed when moving data, the tree protocol measures the download time of 10 Kbytes. This measurement includes all the costs of serving actual content. We have observed that this approach to measuring bandwidth gives us better results than approaches based on low-level bandwidth measurements such as using ping. On the other hand, we recognize that a 10 Kbyte message is too short to accurately reflect the bandwidth of "long fat pipes". We plan to move to a technique that uses progressively larger measurements until a steady state is observed.

When the measured bandwidths to two nodes are within 10% of each other, we consider the nodes equally good and select the node that is closest, as reported by traceroute. This avoids frequent topology changes between two nearly equal paths, as well as decreasing the total number of network links used by the system.

A node periodically reevaluates its position in the tree by measuring the bandwidth to its current siblings (an up-to-date list is obtained from the parent), parent, and grandparent. Just as in the initial building phase, a node will relocate below its siblings if that does not decrease its bandwidth back to the root. The node checks bandwidth directly to the grandparent as a way of testing its previous decision to locate under its current parent. If necessary the node moves back up in the hierarchy to become a sibling of its parent. As a result, nodes constantly reevaluate their position in the tree and an Overcast network is inherently tolerant of nonroot node failures. If a node goes offline for some reason, any nodes that were below it in the tree will reconnect themselves to the rest of the routing hierarchy. When a node detects that its parent is unreachable, it will simply relocate beneath its grandparent. If its grandparent is also unreachable the node will continue to move up its ancestry until it finds a live node. The ancestor list also allows cycles to be avoided as nodes asynchronously choose new parents. A node simply refuses to become the parent of a node it believes to be it's own ancestor. A node that chooses such a node will forced to rechoose.

While there is extensive literature on faster fail-over algorithms, we have not yet found a need to optimize beyond the strategy outlined above. It is important to remember that the nodes participating in this protocol are dedicated machines that are less prone to failure than desktop computers. If this becomes an issue, we have considered extending the tree building algorithm to maintain backup parents (excluding a node's own ancestry from consideration) or an entire backup tree.

By periodically remeasuring network performance, the overlay network can adapt to network conditions that manifest themselves at time scales larger than the frequency at which the distribution tree reorganizes. For example, a tree that is optimized for bandwidth efficient content delivery during the day may be significantly suboptimal during the overnight hours (when network congestion is typically lower). The ability of the tree protocol to automatically adapt to these kinds of changing network conditions provides an important advantage over simpler, statically configured content distribution schemes.

4.3 The Up/Down Protocol

To allow web clients to join a group quickly, the Overcast network must track the status of the Overcast nodes. It may also be important to report statistical information back to the root, so that content providers might learn, for instance, how often certain content is being viewed. This section describes a protocol for efficient exchange of information in a tree of network nodes to provide the root of the tree with information from nodes throughout the network. For our needs, this protocol must scale sublinearly in terms of network usage at the root, but may scale linearly in terms of space (all with respect to the number of Overcast nodes). This is a simple result of the relative requirements of a client for these two resources and the cost of those resources. Overcast might store (conservatively) a few hundred bytes about each Overcast node, but even in a group of millions of nodes, total RAM cost for the root would be under $1,000. We call this protocol the "up/down" protocol because our current system uses it mainly to keep track of what nodes are up and what nodes are down. However, arbitrary information in either of two large classes may be propagated to the root. In particular, if the information either changes slowly (e.g., up/down status of nodes), or the information can be combined efficiently from multiple children into a single description (e.g., group membership counts), it can be propagated to the root. Rapidly changing information that can not be aggregated during propagation would overwhelm the root's bandwidth capacity.

Each node in the network, including the root node, maintains a table of information about all nodes lower than itself in the hierarchy and a log of all changes to the table. Therefore the root node's table contains up-to-date information for all nodes in the hierarchy. The table is stored on disk and cached in the memory of a node. The basis of the protocol is that each node periodically checks in with the node directly above it in the tree. If a child fails to contact its parent within a preset interval, the parent will assume the child and all its descendants have "died". That is, either the node has failed, an intervening link has failed, or the child has simply changed parents. In any case, the parent node marks the child and its descendants "dead" in its table. Parents never initiate contact with descendants. This is a byproduct of a design that is intended to cross firewalls easily. All node failures must be detected by a failure to check in, rather than active probing.

During these periodic check-ins, a node reports new information that it has observed or been informed of since it last checked in. This includes:

"Death certificates"—Children that have missed their expected report time.

"Birth certificates"—Nodes that have become children of the reporting node.

Changes to the reporting node's "extra information."

Certificates or changes that have been propagated to the node from its own children since its last checkin.

This simple protocol exhibits a race condition when a node chooses a new parent. The moving node's former parent propagates a death certificate up the hierarchy, while at nearly the same time the new parent begins propagating a birth certificate up the tree. If the birth certificate arrives at the root first, when the death certificate arrives the root will believe that the node has failed. This inaccuracy will remain indefinitely since a new birth certificate will only be sent in response to a change in the hierarchy that may not occur for an arbitrary period of time.

To alleviate this problem, a node maintains a sequence number indicating of how many times it has changed parents. All changes involving a node are tagged with that number. A node ignores changes that are reported to it about a node if it has already seen a change with a higher sequence number. For instance, a node may have changed parents 17 times.

When it changes again, its former parent will propagate a death certificate annotated with 17. However, its new parent will propagate a birth certificate annotated with 18. If the birth certificate arrives first, the death certificate will be ignored since it is older. An important optimization to the up/down protocol avoids large sets of birth certificates from arriving at the root in response to a node with many descendants choosing a new parent. Normally, when a node moves to a new parent, a birth certificate must be sent out for each of its descendants to its new parent. This maintains the invariant that a node knows the parent of all its descendants. Keep in mind that a birth certificate is not only a record that a node exists, but that it has a certain parent.

Although this large set of updates is required, it is usually unnecessary for these updates to continue far up the hierarchy. For example, when a node relocates beneath a sibling, the sibling must learn about all of the node's descendants, but when the sibling, in turn, passes these certificates to the original parent, the original parent notices that they do not represent a change and quashes the certificate from further propagation.

Using the up/down protocol, the root of the hierarchy will receive timely updates about changes to the network. The freshness of the information can be tuned by varying the length of time between check-ins. Shorter periods between updates guarantee that information will make its way to the root more quickly. Regardless of the update frequency, bandwidth requirements at the root will be proportional to the number of changes in the hierarchy rather than the size of the hierarchy itself.

4.4 Replicating the Root

In Overcast, there appears to be the potential for significant scalability and reliability problems at the root. The up/down protocol works to alleviate the scalability difficulties in maintaining global state about the distribution tree, but the root is still responsible for handling all join requests from all HTTP clients. The root handles such requests by redirection, which is far less resource intensive than actually delivering the requested content. Nonetheless, the possibility of overload remains for particularly popular groups. The root is also a single point of failure.

To address this, overcast uses a standard technique used by many popular websites. The DNS name of the root resolves to any number of replicated roots in round-robin fashion. The database used to perform redirections is replicated to all such roots. In addition, IP address takeover may be used for immediate failover, since DNS caching may cause clients to continue to contact a failed replica. This simple, standard technique works well for this purpose because handling joins from HTTP clients is a read-only operation that lends well to distribution over numerous replicas.

There remains, however, a single point of failure for the up/down protocol. The functionality of the root in the up/down protocol cannot be distributed so easily because its purpose is to maintain changing state. However the up/down protocol has the useful property that all nodes maintain state for nodes below them in the distribution tree. Therefore, a convenient technique to address fault tolerance is to specially construct the top of the hierarchy.

Figure 8:
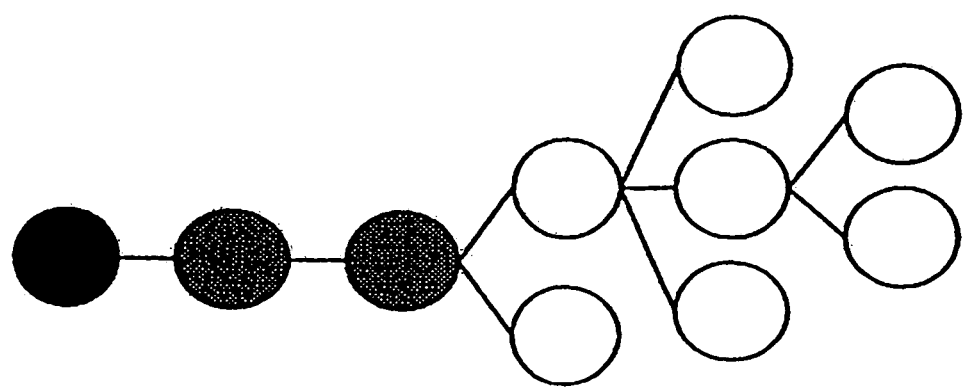
FIG. 8 is a diagram of a distribution tree.

Starting with the root, some number of nodes are configured linearly, that is, each has only one child. In this way all other overcast nodes lie below these top nodes. FIG. 8 shows a distribution tree in which the top three nodes are arranged linearly. Each of these nodes has enough information to act as the root of the up/down protocol in case of a failure. Specifically, the distribution topology is specially configured to allow either of the grey nodes to quickly stand in as the root (black) node. All filled nodes have complete status information about the unfilled nodes. This technique has the drawback of increasing the latency of content distribution unless special-case code skips the extra roots during distribution. If latency were important to Overcast this would be an important, but simple, optimization.

"Linear roots" work well with the need for replication to address scalability, as mentioned above. The set of linear nodes has all the information needed to perform Overcast joins, therefore these nodes are perfect candidates to be used in the DNS round-robin approach to scalability. By choosing these nodes, no further replication is necessary.

4.5 Joining a Multicast Group

To join a multicast group, a Web client issues an HTTP GET request with the URL for a group. The hostname of the URL names the root node(s). The root uses the pathname of the URL, the location of the client, and its database of the current status of the Overcast nodes to decide where to connect the client to the multicast tree. Because status information is constantly propagated to the root, a decision may be made quickly without further network traffic, enabling fast joins.

Joining a group consists of selecting the best server and redirecting the client to that server. The details of the server selection algorithm are beyond the scope of this paper as considerable previous work exists in this area. Furthermore, Overcast's particular choices are constrained considerably by a desire to avoid changes at the client. Without such a constraint simpler choices could have been made, such as allowing clients to participate directly in the Overcast tree building protocol.

Although we do not discuss server selection here, a number of Overcast's details exist to support this important functionality, however it may actually be implemented. A centralized root performing redirections is convenient for an approach involving large tables containing collected Internet topology data. The up/down algorithm allows for redirections to nodes that are known to be functioning.

4.6 Multicasting with Overcast

We refer to reliable multicasting on an overcast network as "overcasting". Overcasting proceeds along the distribution tree built by the tree protocol. Data is moved between parent and child using TCP streams. If a node has four children, four separate connections are used. The content may be pipelined through several generations in the tree. A large file or a long-running live stream may be in transit over tens of different TCP streams at a single moment, in several layers of the distribution hierarchy.

If a failure occurs during an overcast, the distribution tree will rebuild itself as described above. After rebuilding the tree, the overcast resumes for on-demand distributions where it left off. In order to do so, each node keeps a log of the data it has received so far. After recovery, a node inspects the log and restarts all overcasts in progress.

Live content on the Internet today is typically buffered before playback. This compensates for momentary glitches in network throughput. Overcast can take advantage of this buffering to mask the failure of a node being used to Overcast data. As long as the failure occurs in a node that is not at the edge of the Overcast network, an HTTP client need not ever become aware that the path of data from the root has been changed in the face of failure.

5 Evaluation

In this section, the protocols presented above are evaluated by simulation. Although we have deployed Overcast in the real world, we have not yet deployed on a sufficiently large network to run the experiments we have simulated.

To evaluate the protocols, an overlay network is simulated with increasing numbers of overcast nodes while keeping the total number of network nodes constant. Overcast should build better trees as more nodes are deployed, but protocol overhead may grow.

We use the Georgia Tech Internet work Topology Models (GT-ITM) to generate the network topologies used in our simulations. We use the "transit-stub" model to obtain graphs that more closely resemble the Internet than a pure random construction. GT-ITM generates a transit-stub graph in stages, first a number of random backbones (transit domains), then the random structure of each back-bone, then random "stub" graphs are attached to each node in the backbones.

We use this model to construct five different 600 node graphs. Each graph is made up of three transit domains. These domains are guaranteed to be connected. Each transit domain consists of an average of eight stub networks. The stub networks contain edges amongst themselves with a probability of 0.5. Each stub network consists of an average of 25 nodes, in which nodes are once again connected with a probability of 0.5. These parameters are from the sample graphs in the GT-ITM distribution; we are unaware of any published work that describes parameters that might better model common Internet topologies.

We extended the graphs generated by GT-ITM with bandwidth information. Links internal to the transit domains were assigned a bandwidth of 45 Mbits's, edges connecting stub networks to the transit domains were assigned 1.5 Mbits's, finally, in the local stub domain, edges were assigned 100 Mbit's. These are commonly used network technology: T3 s, T1 s, and Fast Ethernet. All measurements are averages over the five generated topologies.

Empirical measurements from actual Overcast nodes show that a single Overcast node can easily support twenty clients watching MPEG-1 videos, though the exact number is greatly dependent on the bandwidth requirements of the content. Thus with a network of 600 overcast nodes, we are simulating multicast groups of perhaps 12,000 members.

5.1 Tree protocol

The efficiency of Overcast depends on the positioning of Overcast nodes. In our first experiments, we compare two different approaches to choosing positions. The first approach, labelled "Backbone", preferentially chooses transit nodes to contain Overcast nodes. Once all transit nodes are Overcast nodes, additional nodes are chosen at random. This approach corresponds to a scenario in which the owner of the Overcast nodes places them strategically in the network. In the second, labelled "Random", we select all Overcast nodes at random. This approach corresponds to a scenario in which the owner of Overcast nodes does not pay attention to where the nodes are placed.

Figure 9:
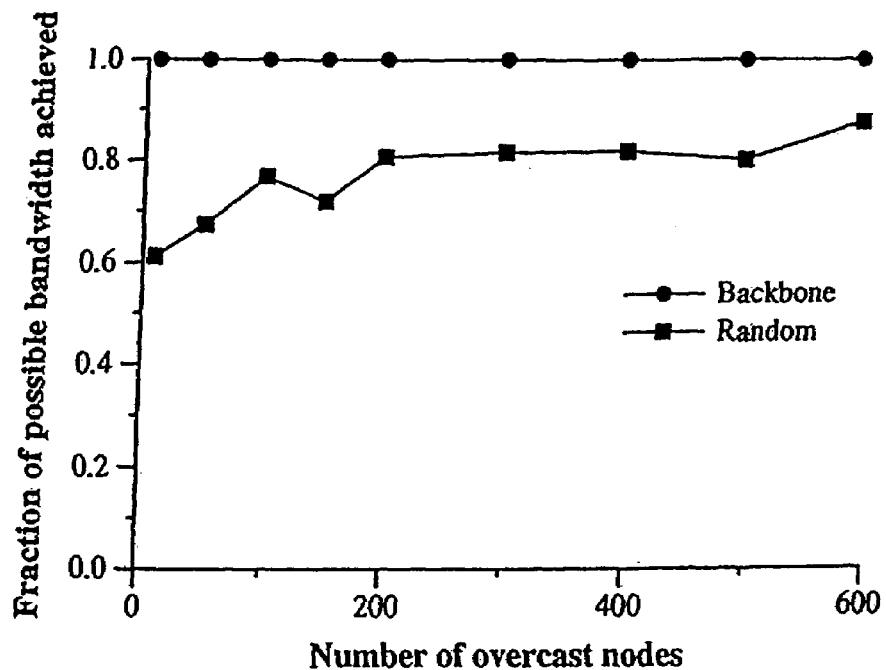
FIG. 9 is a plot of bandwidth versus number of Overcast nodes.

The goal of Overcast's tree-building protocol is to optimize the bottleneck bandwidth available back to the root for all nodes. The goal is to provide each node with the same bandwidth to the root that the node would have in an idle network. FIG. 9 compares the sum of all nodes' bandwidths back to the root in Overcast networks of various sizes to the sum of all nodes' bandwidths back to the root in an optimal distribution tree using router-based software. This indicates how well Overcast performs compared to IP Multicast.

The main observation is that, as expected, the backbone strategy for placing Overcast nodes is more effective than the random strategy, but the results of random placement are encouraging nonetheless. Even a small number of deployed Overcast nodes, positioned at random, provide approximately 70%–80% of the total possible bandwidth.

It is extremely encouraging that, when using the backbone approach, no node receives less bandwidth under Overcast than it would receive from IP Multicast. However some enthusiasm must be withheld, because a simulation artifact has been left in these numbers to illustrate a point.

Notice that the backbone approach and the random approach differ in effectiveness even when all 600 nodes of the network are Overcast nodes. In this case the same nodes are participating in the protocol, but better trees are built using the backbone approach. This illustrates that the trees created by the tree-building protocol are not unique. The backbone approach fares better by this metric because in our simulations backbone nodes were turned on first. This allowed backbone nodes to preferentially form the "top" of the tree. This indicates that in future work it may be beneficial to extend the tree-building protocol to accept hints that mark certain nodes as "backbone" nodes. These nodes would preferentially form the core of the distribution tree. Overcast appears to perform quite well for its intended goal of optimizing available bandwidth, but it is reasonable to wonder what costs are associated with this performance.

Figure 10:
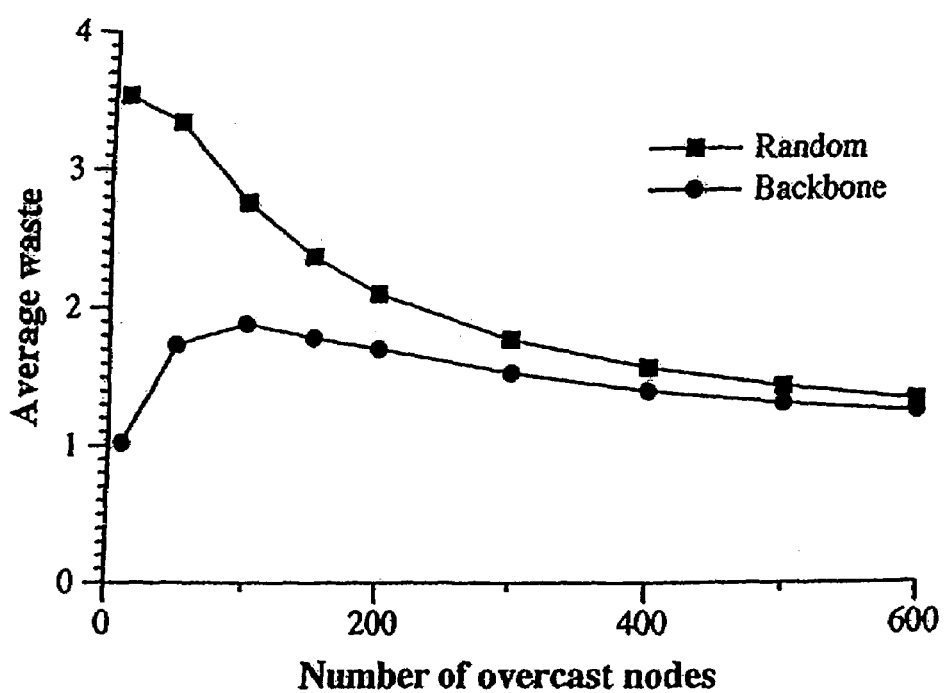
FIG. 10 is a plot of average waste versus number of Overcast nodes.

To explore this question we measure the network load imposed by Overcast. We define network load to be the number of times that a particular piece of data must traverse a network link to reach all Overcast nodes. In order to compare to IP Multicast FIG. 10 plots the ratio of the network load imposed by Overcast to a lower bound estimate of IP Multicast's network load. For a given set of nodes, we assume that IP Multicast would require exactly one less link than the number of nodes. This assumes that all nodes are one hop away from another node, which is unlikely to be true in sparse topologies, but provides a lower bound for comparison.

FIG. 10 shows that for Overcast networks with greater than 200 nodes Overcast imposes somewhat less than twice as much network load as IP Multicast. In return for this extra load Overcast offers reliable delivery, immediate deployment, and future flexibility. For networks with few Overcast nodes, Overcast appears to impose a considerably higher network load than IP Multicast. This is a result of our optimistic lower bound on IP Multicast's network load, which assumes that 50 randomly placed nodes in a 600 node network can be spanned by 49 links.

Another metric to measure the effectiveness of an application-level multicast technique is stress, proposed in. Stress indicates the number of times that the same data traverses a particular physical link. By this metric, Overcast performs quite well with average stresses of between 1 and 1.2. We do not present detailed analysis of Overcast's performance by this metric, however, because we believe that network load is more telling for Overcast. That is, Overcast has quite low scores for average stress, but that metric does not describe how often a longer route was taken when a shorter route was available.

Another question is how fast the tree protocol converges to a stable distribution tree, assuming a stable underlying network. This is dependent on three parameters. The round period controls how long a node that has not yet determined a stable position in the hierarchy will wait before evaluating a new set of potential parents. The reevaluation period determines how long a node will wait before reevaluating its position in the hierarchy once it has obtained a stable position. Finally the lease period determines how long a parent will wait to hear from a child before reporting the child's death.

Figure 11:
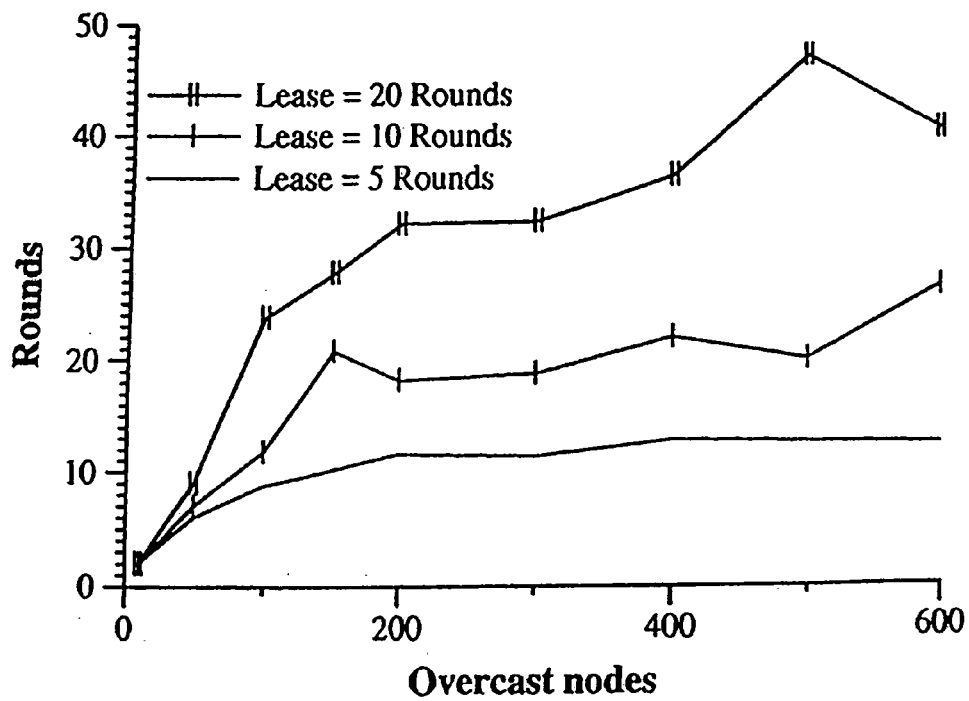
FIG. 11 is a plot of number of rounds versus number of Overcast nodes.

For convenience, we measure all convergence times in terms of the fundamental unit, the round time. We also set the reevaluation period and lease period to the same value. FIG. 11 shows how long Overcast requires to converge if an entire Overcast network is simultaneously activated. To demonstrate the effect of a changing reevaluation and lease period, we plot for the "standard" lease time—10 rounds, as well as longer and shorter periods. Lease periods shorter than five rounds are impractical because children actually renew their leases a small random number of rounds (between one and three) before their lease expires to avoid being thought dead. We expect that a round period on the order of 1–2 seconds will be practical for most applications.

We next measure convergence times for an existing Overcast network in which overcast nodes are added or fail. We simulate overcast networks of various sizes until they quiesce, add and remove Overcast nodes, and then simulate the network until it quiesces once again.

We measure the time, in rounds, for the network to quiesce after the changes. We measure for various numbers of additions and removals allowing us to assess the dependence of convergence on how many nodes have changed state. We measure only the backbone approach.

Figure 12:
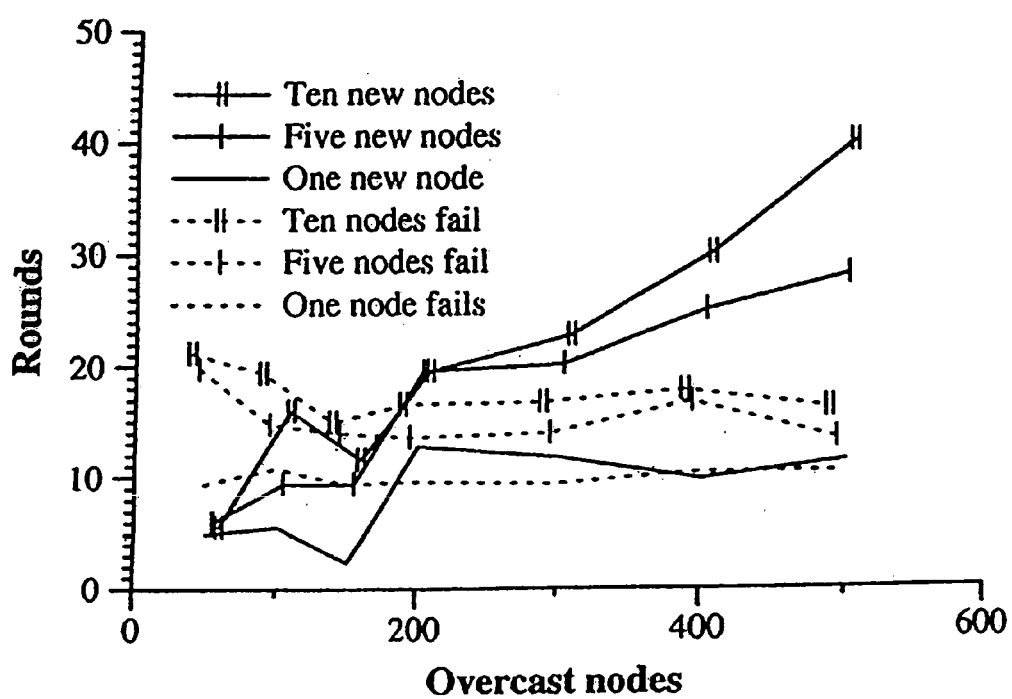
FIG. 12 is a plot of number of rounds versus versus number of Overcast nodes.

FIG. 12 plots convergence times (using a 10 round lease time) against the number of overcast nodes in the network. The convergence time for node failures is quite modest. In all simulations the Overcast network reconverged after less than three lease times. Furthermore, the reconvergence time scaled well against both the number of nodes failing and the total number of nodes in the overcast network. In neither case was the convergence time even linearly affected.

For node additions, convergence times do appear more closely linked to the size of the Overcast network. This makes intuitive sense because new nodes are navigating the network to determine their best location. Even so, in all simulations fewer than five lease times are required. It is important to note that an Overcast network continues to function even while stabilizing. Performance may be somewhat impacted by increased measurement traffic and by TCP setup and tear down overhead as parents change, but such disruptions are localized.

5.2 Up/Down protocol

The goal of the up/down algorithm is to minimize the bandwidth required at the root node while maintaining timely status information for the entire network. Factors that affect the amount of bandwidth used include the size of the overcast network and the rate of topology changes. Topology changes occur when the properties of the underlying network change, nodes fail, or nodes are added. Therefore the up/down algorithm is evaluated by simulating overcast networks of various sizes in which various numbers of failures and additions occur.

To assess the up/down protocol's ability to provide timely status updates to the root without undue overhead we keep track of the number of certificates (for both "birth" and "death") that reach the root during the previous convergence tests. This is indicative of the bandwidth required at the root node to support an overcast network of the given size and is dependent on the amount of topology change induced by the additions and deletions.

Figure 13:
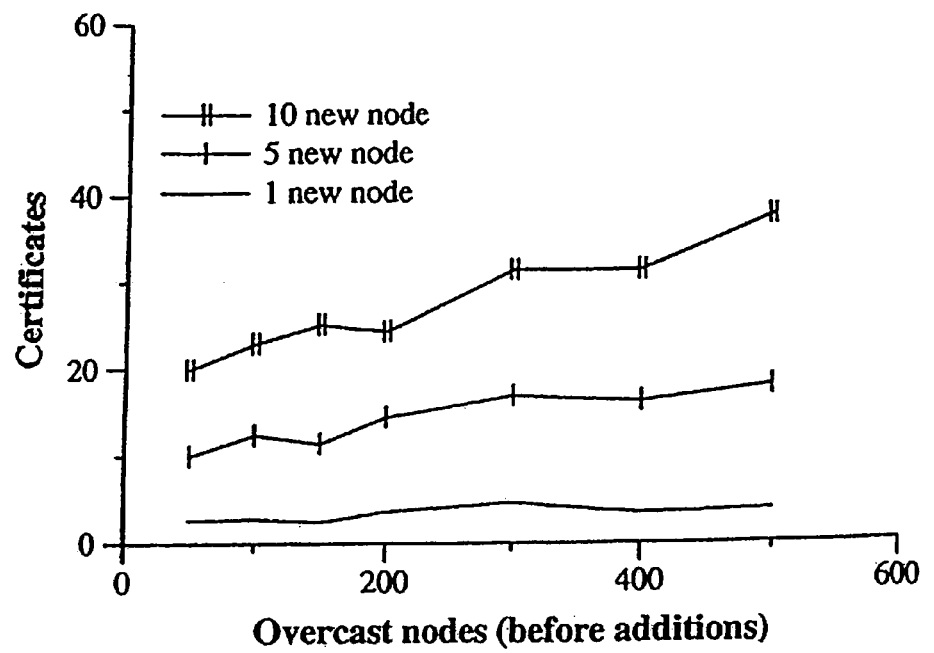
FIG. 13 is a plot of number of certificates versus number of Overcast nodes.

FIG. 13 graphs the number of certificates received by the root node in response to new nodes being brought up in the overcast network. Remember, the root may receive multiple certificates per node addition because the addition is likely to cause some topology reconfiguration. Each time a node picks a new parent that parent propagates a birth certificate. These results indicate that the number of certificates is quite modest: certainly no more than four certificates per node addition, usually approximately three. What is more important is that the number of certificates scales more closely to the number of new nodes than the size of the overcast network. This gives evidence that overcast can scale to large networks.

Figure 14:
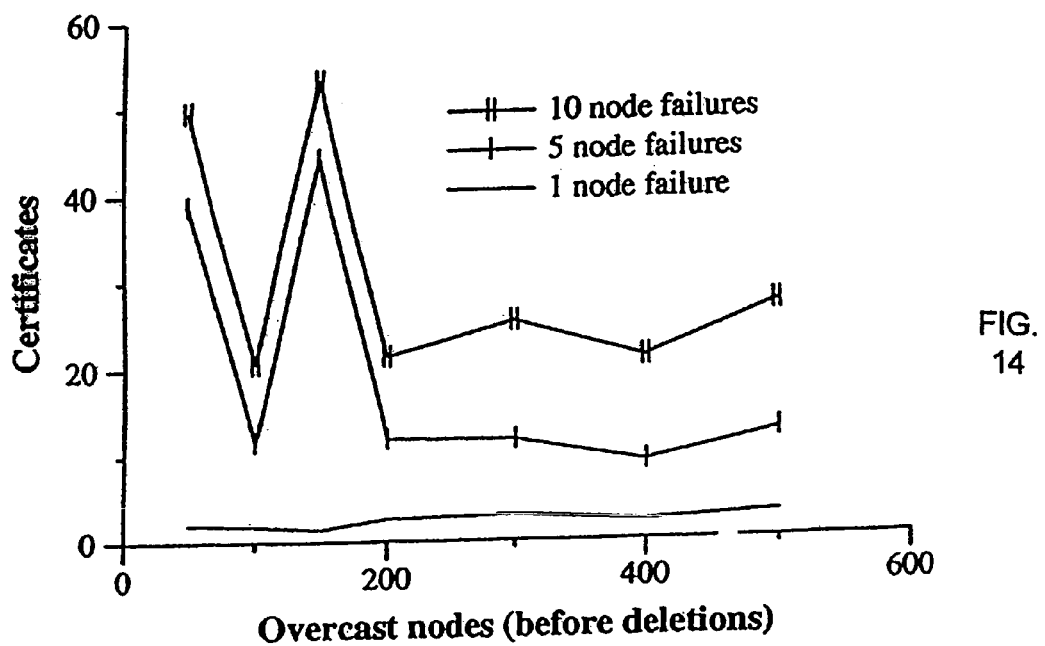
FIG. 14 is a plot of number of certificates versus number of Overcast nodes.

Similarly, Overcast requires few certificates to react to node failures. FIG. 14 shows that in the common case, no more than four certificates are required per node failure. Again, because the number of certificates is proportional to the number of failures rather than the size of the network, Overcast appears to offer the ability to scale to large networks.

On the other hand, FIG. 14 shows that there are some cases that fall far outside the norm. The large spikes at 50 and 150 node networks with 5 and 10 failures occurred because of failures that happened to occur near the root. When a node with a substantial number of children chooses a new parent it must convey it's entire set of descendants to its new parent. That parent then propagates the entire set. However, when the information reaches a node that already knows the relationships in question, the update is quashed. In these cases, because the reconfigurations occurred high in the tree there was no chance to quash the updates before they reached the root. In larger networks such failures are less likely.

6 Conclusions

We have described a simple tree-building protocol that yields bandwidth-efficient distribution trees for single-source multicast and our up/down protocol for providing timely status updates to the root of the distribution tree in scalable manner. Overcast implements these protocols in an overlay network over the existing Internet. The protocols allow Overcast networks to dynamically adapt to changes (such as congestion and failures) in the underlying network infrastructure and support large, reliable single-source multicast groups. Geographically-dispersed businesses have deployed Overcast nodes in small-scale Overcast networks for distribution of high-quality, on-demand video to unmodified desktops.

Simulation studies with topologies created with the Georgia Tech Internet work Topology Models show that Overcast networks work well on large-scale networks, supporting multicast groups of up to 12,000 members. Given these results and the low cost for Overcast nodes, we believe that putting computation and storage in the network fabric is a promising approach for adding new services to the Internet incrementally.

What is claimed is:

1. In a transferring node, a method for distributing data in an overlay network based on logical relationships, said overlay network including a hierarchical network of nodes, said overlay network implemented as an abstraction on top of an existing network based on other connections, the method comprising the steps of:
   receiving at the transferring node a collection of data from a provider node in the hierarchical network of nodes;
   transferring a copy of the collection of data to a child node of the transferring node in the hierarchical network of nodes in response to the step of receiving the collection of data; and
   storing the collection of data in a data storage in the transferring node after completing the step of transferring the copy of the collection of data;
   wherein the collection of data represents content distributed as a stream of packets to the hierarchical network from a source node, and wherein:
   the step of receiving the collection of data comprises receiving the stream of packets in a buffer;
   the step of transferring the copy of the collection of data comprises propagating the stream of packets from the buffer to descendent nodes of the transferring node for access by a first client making a first request for the collection of data from the descendent node; and
   the step of storing the collection of data comprises transferring the stream of packets from the buffer to the data storage in the transferring node in a manner enabling access to the collection of data by a second client making a second request for the collection of data.

2. The method of claim 1, wherein the child node is one of a plurality of child nodes, and the step of transferring the copy of the collection of data comprises transferring copies of the collection of data to each of the plurality of child nodes, if each child node is available over the hierarchical network.

3. The method of claim 1, wherein the step of transferring the collection of data comprises receiving a verification from the child node that the copy of the collection of data received by the child node is a complete copy of the collection of data.

4. The method of claim 1, wherein the collection of data comprises a plurality of packets of data and the step of transferring the copy of the collection of data comprises:
   (i) receiving an indication from the child node that the copy of the collection of data received by the child node is incomplete; and
   (ii) transferring copies of at least one packet of data to the child node to complete the copy of the collection of data received by the child node.

5. The method of claim 1, wherein the step of transferring the copy of the collection of data comprises transferring an additional copy of the collection of data to an additional child node of the transferring node based on a request from the additional child node.

6. The method of claim 1, wherein the step of transferring the copy of the collection of data comprises transferring the copy of the collection of data between the provider node and the child node through the transferring node in a delayed timing mode.

7. The method of claim 1, wherein the step of storing the collection of data comprises retaining the collection of data after confirming the receipt of the copy of the collection of data by the child node.

8. The method of claim 1, wherein the step of receiving the collection of data comprises a step of providing an acknowledgment indicating that the collection of data is complete and the step of transferring the collection of data is performed after the step of providing the acknowledgment.

9. The method of claim 1, further comprising the step of:
   maintaining a connection among the network of nodes in order to transfer the collection of data.

10. A method according to claim 1, wherein the provider node is a first provider node from which the transfer node receives the collection of data, and further comprising the steps, performed in the event that the provider node becomes unavailable during the transfer of the copy of the collection of data to the child node, of:
   contacting another node of the overlay network to obtain the collection of data; and
   continuing to transfer the collection of data to the child node based on copying the collection of data from the other node.

11. A method according to claim 10, wherein the other node is a grandparent node of the transferring node.

12. A computer system for distributing data in an overlay network based on logical relationships, said overlay network including an hierarchical network of nodes, said overlay network implemented as a network abstraction on top off an existing network based on other connections, the computer system comprising:
  a memory;
  a data storage;
  a network interface in communication with the memory and the data storage; and
  a processor in communication with the memory, the data storage, and the network interface,
  wherein the memory is encoded with logic instructions for a data manager application that, when performed on the processor, cause the processor to form a data manager that manages the distribution of data in the hierarchical network by performing operations of:
    receiving a collection of data at a transferring node from a provider node in the hierarchical network of nodes;
    transferring a copy of the collection of data to a child node of the transferring node in the hierarchical network of nodes in response to the step of receiving the collection of data; and
    storing the collection of data in a data storage at the transferring node after completing the transferring of the copy of the collection of data;
  and further comprising a buffer;
  and wherein the collection of data represents content distributed a stream of packets to the hierarchical network from a source node and the logic instructions for the data manager application comprise further logic instructions, that, when performed on the processor, cause the data manager to perform operations of:
    receiving the stream of packets in the buffer;
    propagating the stream of packets from the buffer to descendent nodes of the transferring node for access by a first client making a first request for the collection of data from the descendent node; and
    transferring the stream of packets from the buffer to the data storage in the transferring node in a manner enabling access to the collection of data by a second client making a second request for the collection of data.

13. The computer system of claim 12, wherein the child node is one of a plurality of child nodes, and the logic instructions for the data manager application comprise further logic instructions, that, when performed on the processor, cause the data manager to perform an operation of transferring copies of the collection of data to each of the plurality of child nodes, if each child node is available over the hierarchical network.

14. The computer system of claim 12, wherein the logic instructions for the data manager application comprise further logic instructions, that, when performed on the processor, cause the data manager to perform an operation of receiving a verification from the child node that the copy of the collection of data received by the child node is a complete copy of the collection of data.

15. The computer system of claim 12, wherein the collection of data comprises a plurality of packets of data and the logic instructions for the data manager application comprise further logic instructions, that, when performed on the processor, cause the data manager to perform operations of:

(i) receiving an indication from the child node that the copy of the collection of data received by the child node is incomplete; and
  (ii) transferring copies of at least one packet of data to the child node to complete the copy of the collection of data received by the child node.

16. The computer system of claim 12, wherein the logic instructions for the data manager application comprise further logic instructions, that, when performed on the processor, cause the data manager to perform an operation of transferring an additional copy of the collection of data to an additional child node of the transferring node based on a request from the additional child node.

17. The computer system of claim 12, wherein the logic instructions for the data manager application comprise further logic instructions, that, when performed on the processor, cause the data manager to perform an operation of transferring the copy of the collection of data between the provider node and the child node through the transferring node in a delayed timing mode.

18. The computer system of claim 12, wherein the logic instructions for the data manager application comprise further logic instructions, that, when performed on the processor, cause the data manager to perform an operation of retaining the collection of data after confirming the receipt of the copy of the collection of data by the child node.

19. The computer system of claim 12, wherein the logic instructions for the data manager application comprise further logic instructions, that, when performed on the processor, cause the data manager to perform an operation of transferring the collection of data after providing an acknowledgment indicating that the collection of data is complete.

20. A computer system according to claim 12, wherein the provider node is a first provider node from which the transfer node receives the collection of data, and wherein the logic instructions for the data manager application comprise further logic instructions that, when performed on the processor in the event that the provider node becomes unavailable during the transfer of the copy of the collection of data to the child node, cause the data manager to perform operations of:
  contacting another node of the overlay network to obtain the collection of data; and
  continuing to transfer the collection of data to the child node based on copying the collection of data from the other node.

21. A computer system according to claim 20, wherein the other node is a grandparent node of the transferring node.

22. A computer program product that includes a computer readable medium having instructions stored thereon for distributing data in an overlay network based on logical relationships, said overlay network including an hierarchical network, the overlay network implemented as a network abstraction on top of an existing network based on other connections, such that the instructions, when carried out by a computer, cause the computer to perform steps of:
  receiving a collection of data at a transferring node from a provider node in the hierarchical network of nodes;
  transferring a copy of the collection of data to a child node of the transferring node in the hierarchical network of nodes in response to the step of receiving the collection of data; and
  storing the collection of data in a data storage at the transferring node after completing the step of transferring the copy of the collection of data wherein the collection of data represents content distributed as a stream of packets to the hierarchical network from a source node, and wherein:

the step of receiving the collection of data comprises receiving the stream of packets in a buffer;

the step of transferring the copy of the collection of data comprises propagating the stream of packets from the buffer to descendent nodes of the transferring node for access by a first client making a first request for the collection of data from the descendent node; and the step of storing the collection of data comprises transferring the stream of packets from the buffer to the data storage in the transferring node in a manner enabling access to the collection of data by a second client making a second request for the collection of data.

23. A computer system for distributing data in an overlay network based on logical relationships, said overlay network including an hierarchical network of nodes, the overlay network implemented as a network abstraction on top off an existing network based on other connections, the computer system comprising:

means for receiving a collection of data at a transferring node from a provider node in the hierarchical network of nodes;

means for transferring a copy of the collection of data to a child node of the transferring node in the hierarchical network of nodes in response to the step of receiving the collection of data; and means for storing the collection of data in a data storage at the transferring node after completing the step of transferring the copy of the collection of data;

and wherein the collection of data represents content distributed as a stream of packets to the hierarchical network from a source node, and wherein:

the receiving means includes means for receiving the stream of packets in a buffer;

the transferring means includes means for propagating the stream of packets from the buffer to descendent nodes of the transferring node for access by a first client making a first request for the collection of data from the descendent node; and the storing means includes means for transferring the stream of packets from the buffer to the data storage in the transferring node in a manner enabling access to the collection of data by a second client making a second request for the collection of data.

24. The method of claim 1 further comprising allowing access to the collection of data in the data storage at the transferring node at a later time by at least one of the child node and another node.

25. The method of claim 1 wherein the step of receiving the collection of data from the provider node includes the step of obtaining a multicast video stream and buffering a version of the multicast video stream completely in volatile memory;

wherein the step of transferring the copy of the collection of data includes the step of reading the buffered version of the multicast video stream from the volatile memory and sending that buffered version of the multicast video stream to the child node;

wherein the step of storing the collection of data in the data storage includes the step of, in response to completing transfer of the buffered version of the multicast video stream to the child node, saving a copy of the buffered version of the multicast video stream in non-volatile memory; and wherein the method further comprises the steps of (i) acquiring a request for the data from a requesting node at a later time, (ii) retrieving the saved copy of the buffered version of the multicast video stream from the non-volatile memory, and (iii) sending the saved copy to the requesting node.

26. The computer system of claim 12 wherein the memory is encoded with logic instructions for a data manager application that, when performed on the processor, cause the processor to form a data manager that manages the distribution of data in the hierarchical network by performing operations of:

allowing access to the collection of data in the data storage at the transferring node at a later time by at least one of the child node and another node.

27. The computer system of claim 12 wherein the memory is encoded with logic instructions for a data manager application that, when performed on the processor, cause the processor to form a data manager that manages the distribution of data in the hierarchical network by performing operations of:

wherein the step of receiving the collection of data from the provider node includes the step of obtaining a multicast video stream and buffering a version of the multicast video stream completely in volatile memory;

wherein the step of transferring the copy of the collection of data includes the step of reading the buffered version of the multicast video stream from the volatile memory and sending that buffered version of the multicast video stream to the child node;

wherein the step of storing the collection of data in the data storage includes the step of, in response to completing transfer of the buffered version of the multicast video stream to the child node, saving a copy of the buffered version of the multicast video stream in non-volatile memory; and wherein the method further comprises the steps of (i) acquiring a request for the data from a requesting node at a later time, (ii) retrieving the saved copy of the buffered version of the multicast video stream from the non-volatile memory, and (iii) sending the saved copy to the requesting node.

28. The computer program product of claim 22 further comprising:

instructions wherein the step of receiving the collection of data from the provider node includes the step of obtaining a multicast video stream and buffering a version of the multicast video stream completely in volatile memory;

instructions wherein the step of transferring the copy of the collection of data includes the step of reading the buffered version of the multicast video stream from the volatile memory and sending that buffered version of the multicast video stream to the child node;

instructions wherein the step of storing the collection of data in the data storage includes the step of, in response to completing transfer of the buffered version of the multicast video stream to the child node, saving a copy of the buffered version of the multicast video stream in non-volatile memory; and instructions wherein the method further comprises the steps of (i) acquiring a request for the data from a requesting node at a later time, (ii) retrieving the saved copy of the buffered version of the multicast video stream from the non-volatile memory, and (iii) sending the saved copy to the requesting node.

29. The transferring node of claim 1 wherein said hierarchical network of nodes comprise a distribution tree.

30. The transferring node of claim 29 wherein said distribution tree is rooted at a source node, said source node comprising said transferring node.

31. The computer system of claim 12 wherein said hierarchical network of nodes comprise a distribution tree.

32. The computer system of claim 31 wherein said distribution tree is rooted at a source node, said source node comprising said transferring node.

33. The computer program product of claim 22 wherein said hierarchical network of nodes comprise a distribution tree.

34. The computer program product of claim 33 wherein said distribution tree is rooted at a source node, said source node comprising said transferring node.

35. The computer system of claim 23 wherein said hierarchical network of nodes comprise a distribution tree.

36. The computer system of claim 35 wherein said distribution tree is rooted at a source node said source node comprising aid transferring node.

37. In a transferring node, a method for distributing data in an overlay network based on logical relationships, said overlay network including a hierarchical network of nodes, said overlay network implemented as an abstraction on top of an existing network based on other connections, the method comprising the steps of:

receiving at the transferring node a collection of data from a provider node in the overlay network including a hierarchical network of nodes, said overlay network implemented as an abstraction on top of an existing network based on other connections;

transferring a copy of the collection of data to a child node of the transferring node in the overlay network including a hierarchical network of nodes in response to the step of receiving the collection of data; and storing the collection of data in a data storage in the transferring node after completing the step of transferring the copy of the collection of data;

wherein the collection of data represents content distributed as a stream of packets to the hierarchical network from a source node, and wherein:

the step of receiving the collection of data comprises receiving the stream of packets in a buffer;

the step of transferring the copy of the collection of data comprises propagating the stream of packets from the buffer to descendent nodes of the transferring node for access by a first client making a first request for the collection of data from the descendent node; and the step of storing the collection of data comprises transferring the stream of packets from the buffer to the data storage in the transferring node in a manner enabling access to the collection of data by a second client making a second request for the collection of data.

* * * * *